United States Patent
Samukawa et al.

(10) Patent No.: US 9,714,824 B2
(45) Date of Patent: Jul. 25, 2017

(54) LENS SHAPE MEASUREMENT DEVICE

(75) Inventors: Masahiko Samukawa, Akishima (JP); Takashi Daimaru, Akiruno (JP); Nobuhiko Takeda, Akiruno (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 13/638,779

(22) PCT Filed: Mar. 31, 2011

(86) PCT No.: PCT/JP2011/058197
§ 371 (c)(1),
(2), (4) Date: Oct. 22, 2012

(87) PCT Pub. No.: WO2011/125829
PCT Pub. Date: Oct. 13, 2011

(65) Prior Publication Data
US 2013/0050712 A1    Feb. 28, 2013

(30) Foreign Application Priority Data

Mar. 31, 2010  (JP) .................. 2010-084212
Mar. 31, 2010  (JP) .................. 2010-084213

(51) Int. Cl.
*G01B 11/24*    (2006.01)
*G01M 11/02*    (2006.01)

(52) U.S. Cl.
CPC ........... *G01B 11/24* (2013.01); *G01M 11/025* (2013.01)

(58) Field of Classification Search
CPC ......................... G01M 11/025; G01B 11/24
(Continued)

(56) References Cited

U.S. PATENT DOCUMENTS 5,042,945 A  *  8/1991  Shibata et al. ............... 356/150
6,749,377 B2     6/2004  Gottschald et al.
(Continued)

FOREIGN PATENT DOCUMENTS

JP    A-5-111862    5/1993
JP    H06-102037 A  4/1994
(Continued)

OTHER PUBLICATIONS http://farside.ph.utexas.edu/teaching/302l/lectures/node127.html.*
(Continued)

*Primary Examiner* — Tarifur Chowdhury
*Assistant Examiner* — Mohamed K Amara
(74) *Attorney, Agent, or Firm* — Oliff PLC

(57) ABSTRACT

A lens shape measurement device, includes: a rotation unit that rotates a lens supported by a stage; a laser displacement meter; a first moving unit that moves the laser displacement meter in a X-direction; a second moving unit that moves the lens in a Y-direction; and a drive controller that controls a drive of the rotation unit, the first moving unit, and the second moving unit in a mirror reflection state in which an incidence angle of the laser beams incident on a measurement target from the laser displacement meter, and a reflection angle of the laser beams reflected by the measurement target are equal to each other with a normal line of the lens passing through the measurement target set as a reference, for each of a plurality of measurement targets set on an edge of the lens in a rotating direction of the lens.

18 Claims, 15 Drawing Sheets

(58) Field of Classification Search
USPC .......................... 356/124, 399, 601, 612, 625
See application file for complete search history.

(56) References Cited

U.S. PATENT DOCUMENTS

| | | | |
|---|---|---|---|
| 2002/0176756 A1* | 11/2002 | Gottschald et al. ........... | 409/132 |
| 2005/0117207 A1* | 6/2005 | Haisch .......................... | 359/381 |
| 2006/0120508 A1* | 6/2006 | Chen et al. ..................... | 378/84 |
| 2009/0268199 A1 | 10/2009 | Inoguchi | |
| 2010/0128285 A1* | 5/2010 | Wang et al. ................... | 356/609 |

FOREIGN PATENT DOCUMENTS

| | | |
|---|---|---|
| JP | A-10-58294 | 3/1998 |
| JP | A-2007-51895 | 3/2007 |
| JP | 2007-178367 A | 7/2007 |
| JP | A-2008-16066 | 1/2008 |
| WO | WO 2008/016066 A1 | 2/2008 |

OTHER PUBLICATIONS

International Search Report issued in International Patent Application No. PCT/JP2011/058197 mailed May 31, 2011.
Jan. 21, 2015 Office Action issued in Japanese Application No. 2012-509568.
Sep. 20, 2016 Search Report issued in European Patent Application No. 11765729.6.

\* cited by examiner (A)

(B)

(A)

(B)

(A)

(B)

LENS SHAPE MEASUREMENT DEVICE

TECHNICAL FIELD

The present invention relates to a lens shape measurement device.

DESCRIPTION OF RELATED ART

In order to frame a prescribed spectacle lens into a spectacle frame, an uncut lens (non-edged lens) such as a circular or an oval lens supplied from a lens manufacturer, is subjected to lens edging (called a edging hereafter), so as to match a lens frame shape (lens shape) of the spectacle frame. The lens shape is different depending on a design of a frame, and the edging is different depending on a type of the frame. The spectacle frame is roughly classified into a rimless frame and a rim frame (called a full rim frame hereafter). A V-shaped bevel groove is formed on the lens frame of the full rim frame, so that a framed lens is subjected to the edging so as to correspond to its rim shape.

Meanwhile, in the spectacle lens which is subjected to edging so as to match a normal rimless frame, a side surface of a spectacle lens (edge) is flat having no bevel groove. However, there is also a rimless frame called a semi-rimless type with a side surface of a spectacle lens (edge) formed into a flat shape not having a bevel groove but having a rim in an eyebrow part in an upper part of the spectacle frame, with no rim in a lower part. In the edged lens of this type, a concave-shaped groove is formed on the edge, so that a lens is supported by a nylon from a frame in the upper part.

The edging applied to the lens of the rimless frame, is called a flat edging or a groove edging. Thus, the lens shape is different depending on the type of the frame, and therefore the edging is also different, and further the shape of the edge is also different. In addition, the edge is edged into a mirror face from an aesthetic point of view. Thus, an operation of edging a lens into the lens shape is called the edging, in accordance with the type of the frame.

The edging is performed using an edging device (lens edger). However, when an edging error in the lens shape by this device exceeds an allowable range, there is a possibility that inconveniences are invited such that the edged lens cannot be framed into the spectacle frame, or in a case of the rimless frame, a spectacle cannot be adjusted by assembling it into frame components. Therefore, an edge shape of a bevel or a groove, a lens shape of the lens, and a peripheral length of the bevel or a peripheral length of the groove, etc., are measured for the purpose of inspecting whether or not the lens after edging is edged based on the data regarding the edging.

Conventionally, a contact type measurement is widely used as a measurement system of a spectacle lens, wherein a probe is brought into contact with the edge of the lens. However, in recent years, a non-contact type lens measurement method using a laser displacement meter is proposed (for example, see patent document 1). In this lens measurement method, the lens is held by interposing the lens from both sides by holding axes, then positions in an axis direction and positions in a rotating direction of the holding axes are varied and a peripheral edge of the lens is irradiated with laser beams using the laser displacement meter to receive its reflected light, and measure the lens shape of the lens.

PRIOR ART DOCUMENT

Patent Document

Patent document 1: Published Japanese Translation of PCT application NO. 2008-016066

SUMMARY OF THE INVENTION

Problem to be Solved by the Invention

Generally, although the edge of the lens after edging appears to be clouded due to surface roughness by a grinding tool, mirror finishing is also performed for smoothening the lens edge by polishing. Then, the laser beams are hardly reflected by the lens edge by smoothening. Therefore, when the lens with its edge polished is measured utilizing diffused reflection as described above, the laser beams projected from the laser displacement meter is not reflected so much by the lens edge and most of the light enters into the lens. In this state, a reception amount of the light by the laser displacement meter is considerably reduced, compared with a case of measuring the lens with its edge not polished. Therefore, there is a possibility that the reception amount of the light required for properly measuring the lens cannot be secured.

A main purpose of the present invention is to provide a technique capable of accurately measuring a shape and a dimension of the lens using the laser displacement meter even in a case that the lens edge is smoothened by polishing, etc.

Means for Solving a Problem

According to a first aspect of the present invention, there is provided a lens shape measurement device, comprising:
a supporting unit that supports a spectacle lens being a measurement object;
a laser displacement meter that measures a measurement position of the object utilizing a variation of an observation point of a reflected light which varies depending on the measurement position of the object, when the measurement position of an object surface is irradiated with laser beams;
a relative position altering unit that alters a relative position between the spectacle lens supported by the supporting unit and the laser displacement meter; and
a drive controller that controls a drive of the relative position altering unit in such a manner that a positional relation between the spectacle lens and the laser displacement meter is set so that a measurement target set on a lens edge of the spectacle lens is irradiated with the laser beams of the laser displacement meter, and a reflected light is observed in a reflection state that an incidence angle and a reflection angle of the laser beams are equal to each other relative to a normal line of the spectacle lens passing through the measurement target,
wherein the drive controller creates control data for controlling the drive of the relative position altering unit, utilizing edging data applied to the edging of the spectacle lens.

According to a second aspect of the present invention, there is provided the lens shape measurement device according to the first aspect, wherein the drive controller captures measurement data obtained by measuring a first point deviated to one side in a rotating direction of the lens from the measurement target, and a second point deviated to the other side in the rotating direction of the lens from the measurement target, on the lens edge of the spectacle lens, before the measurement target is measured by the laser displacement meter; and controls the relative position altering unit so that a value of the measurement data obtained by measuring the first point and a value of the measurement data obtained by measuring the second point are equal to each other; and thereafter The laser displacement meter is configured to measure the measurement target.

According to a third aspect of the present invention, there is provided a lens shape measurement device, comprising:

a supporting unit that supports a spectacle lens being a measurement object;

a laser displacement meter that measures a measurement position of the object utilizing a variation of an observation point of a reflected light which varies depending on the measurement position of the object, when the measurement position of an object surface is irradiated with laser beams;

a relative position altering unit that alters a relative position between the spectacle lens supported by the supporting unit and the laser displacement meter; and a drive controller that controls a drive of the relative position altering unit, wherein the relative position altering unit includes:

XY-axes moving systems that alter a relative position between the spectacle lens and the laser displacement meter in a direction parallel to a plane including a measurement reference axis of the laser displacement meter;

a Z-axis moving system that alters the relative position between the spectacle lens and the laser displacement meter in a direction vertical to the plane; and a θ-axis rotation system that rotates the spectacle lens around a rotation axis vertical to the plane, the drive controller comprising:

a first drive controller that drives the relative position altering unit so that one of the measurement target portions on the lens edge of the spectacle lens is moved to a focal position on the measurement reference axis of the laser displacement meter; and a second drive controller that drives the XY-axes moving systems and the θ-axis rotation system so that the spectacle lens is moved by the first drive controller and thereafter is rotated around the measurement target.

According to a fourth aspect of the present invention, there is provided a lens shape measurement device, comprising:

a supporting unit that supports a spectacle lens being a measurement object;

a laser displacement meter that measures a measurement position of the object utilizing a variation of an observation point of a reflected light which varies depending on the measurement position of the object, when the measurement position of an object surface is irradiated with laser beams;

a relative position altering unit that alters a relative position between the spectacle lens supported by the supporting unit and the laser displacement meter; and a drive controller that controls a drive of the relative position altering unit, wherein the relative position altering unit includes:

XY-axes moving systems that alter a relative position between the spectacle lens and the laser displacement meter in a direction parallel to a plane including a measurement reference axis of the laser displacement meter;

a Z-axis moving system that alters the relative position between the spectacle lens and the laser displacement meter in a direction vertical to the plane; and a θ-axis rotation system that rotates the spectacle lens around a rotation axis vertical to the plane, the XY-axes moving systems including:

an X-axis moving system and a Y-axis moving system composed of different two moving axes, and the laser displacement meter is attached to one of the X-axis moving system and the Y-axis moving system, and the θ-axis rotation system supporting the spectacle lens is attached to the other one.

According to a fifth aspect of the present invention, there is provided the lens shape measurement device according to the fourth aspect, wherein the laser displacement meter is attached to one of the drive parts through the Z-axis moving system.

Advantage of the Invention

According to the present invention, even in a case that the lens edge is edged into a mirror surface, etc., the dimension and the shape of the lens can be accurately measured using the laser displacement meter.

Further, when an edged shape of the lens is already known, the dimension and the shape of the lens can be further efficiently measured.

DETAILED DESCRIPTION OF THE INVENTION

Embodiments of the present invention will be described in detail hereafter, with reference to the drawings.

<1. Structure of a Lens Shape Measurement Device>
(Structure of a Mechanism System)

Figure 1:
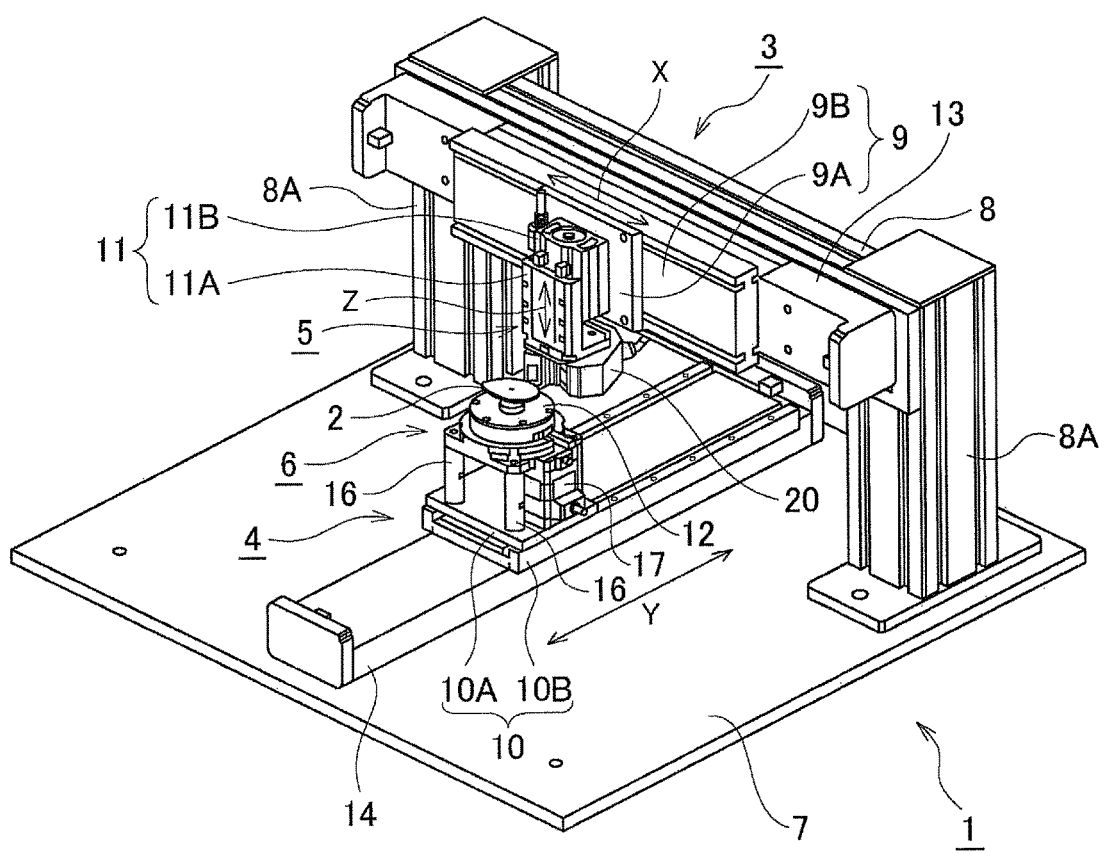
FIG. 1 is a perspective view of a constitutional example of a lens shape measurement device according to an embodiment of the present invention.
Figure 2:
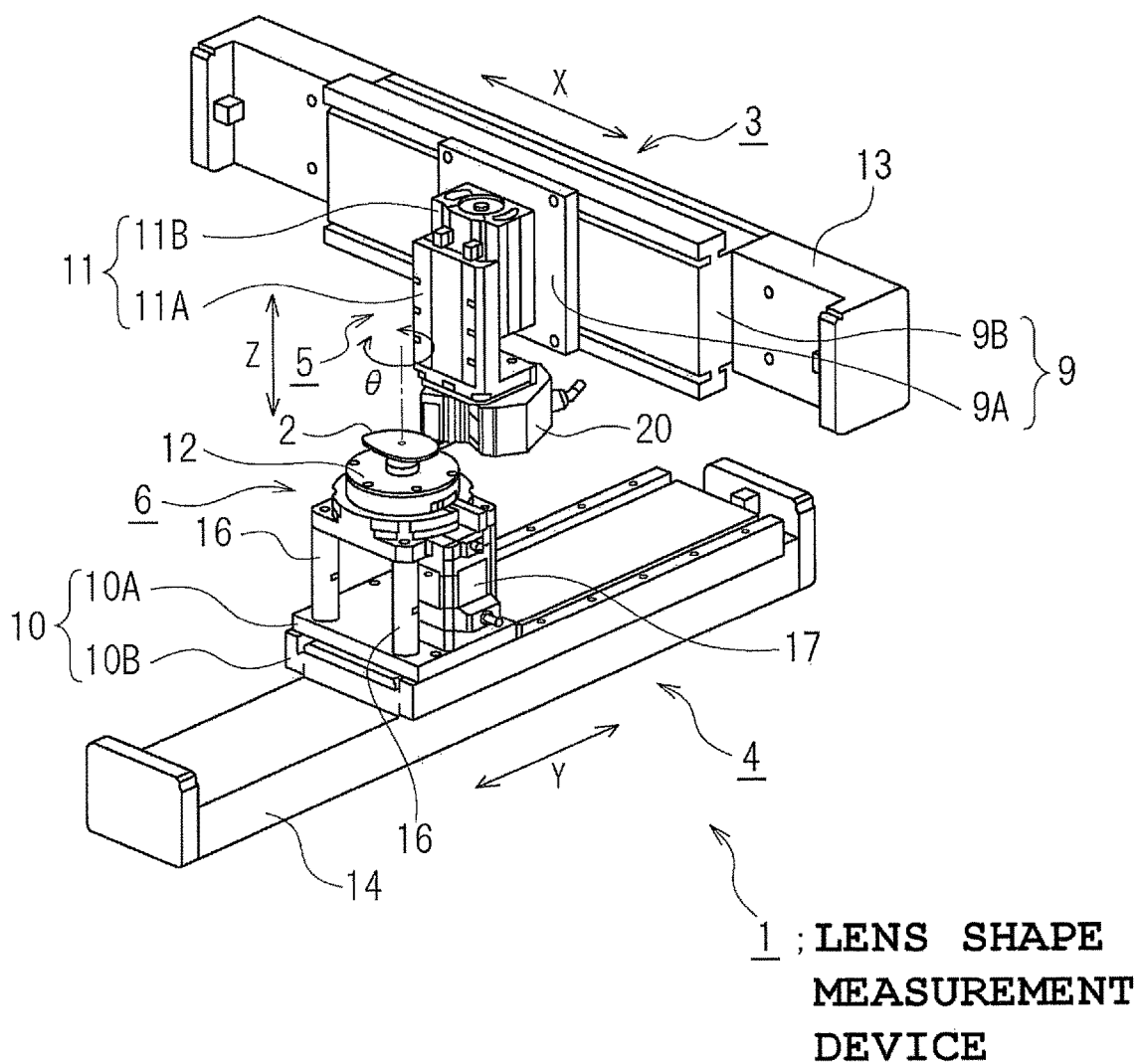
FIG. 2 is a perspective view extracting a part of the lens shape measurement device shown in FIG. 1.

FIG. 1 is a perspective view of a constitutional example of a lens shape measurement device according to an embodiment of the present invention, and FIG. 2 is a perspective view extracting a part of the lens shape measurement device. Note that in FIG. 1 and FIG. 2, a width direction (right and left direction) of the lens shape measurement device is set as a X-direction (also described as "X-axis direction" hereafter), and a depth direction of the lens shape measurement device is set as a Y-direction (also described as "Y-axis direction" hereafter), and a height direction (upper and lower direction) of the lens shape measurement device is set as a Z-direction (also described as "Z-axis direction" hereafter). In the description hereafter, an axis parallel to the X-direction is set as an X-axis, and an axis parallel to the Y-direction is set as a Y-axis, and an axis parallel to the Z-direction is set as a Z-axis. The X-direction, the Y-direction, and the Z-direction are set in a relation orthogonal to each other. Similarly, the X-axis, the Y-axis, and the Z-axis are set in a relation orthogonal to each other. In the embodiment of the present invention, as an example, the X-axis is set as a first axis, and the Y-axis orthogonal to the X-axis is set as a second axis. In this case, the X-direction (X-axis direction) corresponds to the first axis, and the Y-direction (Y-axis direction) corresponds to the second axis. However, the embodiment is not limited thereto, and the X-axis may be set as the second axis, and the Y-axis may be set as the first axis.

In a lens shape measurement device 1 shown in the figure, a lens 2 subjected to edging is used as a measurement target. Further, the lens shape measurement device 1 measures a lens shape for obtaining information regarding at least one of the dimension and the shape of a spectacle lens (also described as a "lens" hereafter) 2. It is known that a lens shape which is the information regarding the dimension and the shape of the lens 2, can be expressed for example as radius vector data (r, θ) over a distance of 360° up to the edge of the lens 2 in a circumferential direction around an axis passing through a prescribed reference position of the lens 2 (for example, a boxing center or an optical center), as described in Japanese Patent Laid Open Publication No. 1993-111862.

Usually, the lens shape is not a true circle, and therefore distance (r) from a supporting center of the lens 2 to the edge, is continuously varied corresponding to an outer circumferential shape of the lens 2 in a circumferential direction (θ) around an axial line of the lens 2.

According to the embodiment of the present invention, the lens shape of the lens is grasped by measuring (detecting) the distance from the supporting center to the edge of the lens 2 using the laser displacement meter. The laser displacement meter measures a measurement position of an object utilizing a variation of an observation position of a reflected light which varies depending on the measurement position of the object, when the measurement position on the surface of the object is irradiated with laser beams.

There are various items in measurement items regarding the lens 2, which can be measured using the lens shape measurement device 1. A circumferential length of the lens 2 can be given as one of them. The lens circumferential length means a bevel circumferential length, a lens circumferential length, and a groove circumferential length, depending on the lens shape of a frame.

The circumferential length of the lens 2 is an important factor showing edging accuracy when a edged lens is framed into the frame.

A width and a chamfering amount of the edge of the lens 2, and an inclination angle of the edge of the lens 2 relative to an optical axis, can be given as other measurement items.

Further, in addition to these measurement items, for example, when a bevel portion of the lens is measured, a bevel shape and a bevel height, and a position of the bevel in a thickness direction of the lens edge (for example, distance from a front surface to top of the bevel of the lens 2), etc., can be given as the measurement items. Further, when a groove is formed on the edge of the lens 2, the shape of the groove, the depth of the groove, and the position of the groove in the thickness direction of the edge of the lens 2 and so forth can be given as the measurement items.

In the present invention, it is no problem in measuring the lens 2 using any kind of the measurement items irrespective of the number of the items, provided that the items are related to the shape and the dimension of the lens that can be measured using measurement data obtained by the laser displacement meter. A specific example of the laser displacement meter being measuring instrument, will be descried later.

The lens shape measurement device 1 has a structure described below for example, as "a relative position altering unit that alters a relative position between a lens supported by a supporting unit and the laser displacement meter". Namely, the laser shape measurement device 1 includes XY axes moving systems that alter the relative position between the spectacle lens and the laser displacement meter in a direction parallel to a plane including a measurement reference axis of the laser displacement meter, and a Z-axis moving system 5 that moves the laser displacement meter in a Z-direction vertical to the plane, and a θ-axis rotation system 6 that rotates the laser displacement meter in a θ-direction. The XY axes moving systems further include an X-axis moving system 3 that moves the laser displacement meter in the X-direction, and a Y-axis moving system 4 that moves the laser displacement meter in the Y-direction. In these moving systems, the X-axis moving system 3 is given as an example of "a first moving unit that moves the laser displacement meter in the first axis direction". "The first moving unit" constitutes "A first relative position altering unit that alters the relative position between the lens and the laser displacement meter in the first axis direction (X-axis direction)".

Meanwhile, the Y-axis moving system 4 is given as an example of "a second moving unit that moves the lens being the measurement target in a second axis direction". "The second moving unit" constitutes "The second relative position altering unit that alters the relative position between the lens and the laser displacement meter in the second axis direction (Y-axis direction)".

The Z-axis moving system 5 is given as an example of "a third moving unit that moves the laser displacement meter in a direction (Z-axis direction) along a rotation axis of the lens as will be described later". "The third moving unit" constitutes "The third relative position altering unit that alters the relative position between the lens and the laser displacement meter in the direction along the rotation axis".

The θ-axis rotation system 6 is provided as an example of "a rotation drive unit that rotates the lens supported by the supporting unit around the rotation axis (rotation axis of the lens; also descried as "θ-axis" hereafter) passing through the supporting center of the lens (for example boxing center)". A specific example of the supporting unit will be descried later.

The laser displacement meter and the θ-axis rotation system 6 are preferable in a point that control is easy by being separately attached to different moving systems of the XY-axes moving systems. According to the embodiment, the laser displacement meter is attached to one of the XY-axes moving systems (X-axis moving system 3) through the Z-axis moving system 5, and the θ-axis rotation system 6 is attached to the other moving system (Y-axis moving system 4). Note that the laser displacement meter may also be attached to the Y-axis moving system 4, and the θ-axis rotation system may also be attached to the X-axis moving system 3.

The Y-axis moving system 4 and the θ-axis rotation system 6 are mounted on a base 7 being the base of the lens shape measurement device 1. The X-axis moving system 3 and the Z-axis moving system 5 are mounted on a frame 8. The frame 8 is formed into a portal type, having posts 8A at both sides.

The X-axis moving system 3 is formed using X-axis stage unit 9. The X-axis stage unit 9 has a structure in which a movable stage 9A and a fixed stage 9B are combined. The stage 9A is movably mounted on the stage 9B using a guide groove, etc. The stage 9A is moved in the X-direction. The X-axis moving system 3 is attached to the frame 8 through a supporting member 13. The supporting member 13 is formed into a longitudinal shape as a whole. The supporting member 13 is horizontally disposed so as to bridge two posts 8A of the frame 8 in the X-direction.

The Y-axis moving system 4 is formed using a Y-axis stage unit 10. The X-axis stage unit 10 has a structure in which a movable stage 10A and a fixed stage 10B are combined. The stage 10A is movably mounted on the stage 10B using a guide groove, etc. The stage 10A is moved in the Y-direction. Further, the Y-axis stage unit 10 is attached to the base 7 through the supporting member 14. The supporting member 14 is formed into a longitudinal shape as a whole. The supporting member 14 is disposed on the base 7 in a direction parallel to the Y-direction.

The Z-axis moving system 5 is formed using Z-axis stage unit 11. The Z-axis stage unit 11 has a structure in which a fixed stage 11A and a movable stage 11B are combined. The stage 11A is movably mounted on the stage 11B using a guide rail, etc. The stage 11A is moved in the Z-direction. The stage 11B on the Z-axis stage unit 11 is vertically fixed to the stage 9A of the X-axis stage unit 9 using a screw, etc. A lower end portion of the stage 11A is bent in L-shape, and the laser displacement meter 20 is attached to a lower surface of the bent portion. The laser displacement meter 20 emits laser beams to the lens edge being the measurement target, and receives the laser beams reflected by the lens edge, to thereby measure a separation distance from the laser displacement meter 20 to the lens edge, and an amount of displacement of the edge. The separation distance from the laser displacement meter 20 to the edge of the lens 2 is varied depending on a separation distance from a supporting center of the lens 2 (called supporting center O hereafter) to the edge. Therefore, based on a measurement result of the lens 2, the separation distance from the supporting center O of the lens 2 to the edge can be grasped. Details of the laser displacement meter 20 will be described later.

The θ-axis rotation system 6 is formed using a θ-stage 12. The aforementioned lens 2 is set in a center portion of the θ-stage 12. At this time, the lens 2 is set in the θ-stage 12 in a state of being held by adsorption, etc., on a holding tool not shown. The "holding tool" described here is also used for applying edging to the lens so as to match the lens shape, and is attached to one of the optical surfaces (for example, front side) by adsorption or an adhesive seal, and is usually called a lens holder (also called a suction cup in a case of being attached by adsorption). Further, the holding tool is one of the elements of supporting units that support the lens 2 being the measurement target.

The holding tool will be further described in detail as follows. The lens 2 is treated in a state of being held by the holding tool even after finishing the edging, and is assembled into the lens shape measurement device 1 as it is. A receiving part (not shown) that constitutes one element of the supporting units together with the holding tool, is provided in the center portion of the θ-stage 12 on which the holding tool is mounted. Then, the lens 2 is set in the θ-stage 12 by inserting the holding tool into the receiving part. Further, although not shown, positioning units (a positioning pin, a positioning groove, and a positioning hole, etc.) for uniquely determining a rotational position of the holding tool, are provided in the center portion of the θ-stage 12 (for example, inside of a reception hole).

The θ-stage 12 is supported by a plurality of posts 16. Each post 16 is vertically erected on the stage 10A of the Y-axis stage unit 10. Further, a rotary actuator 17 is mounted on the stage 10A. The rotary actuator 17 is configured to rotate the holding tool set in the θ-stage 12 and the lens 2 held by the holding tool integrally in the θ-direction. Note that the θ-stage 12 may be integrally rotated with the lens 2 and the holding tool in which the θ-stage 12 itself is set, or only the lens 2 and the holding tool in which the θ-stage is set may be rotated without rotating the θ-stage 12. In this embodiment, the θ-stage 12 is rotated.

(Structure of the laser displacement meter)

Figure 3:
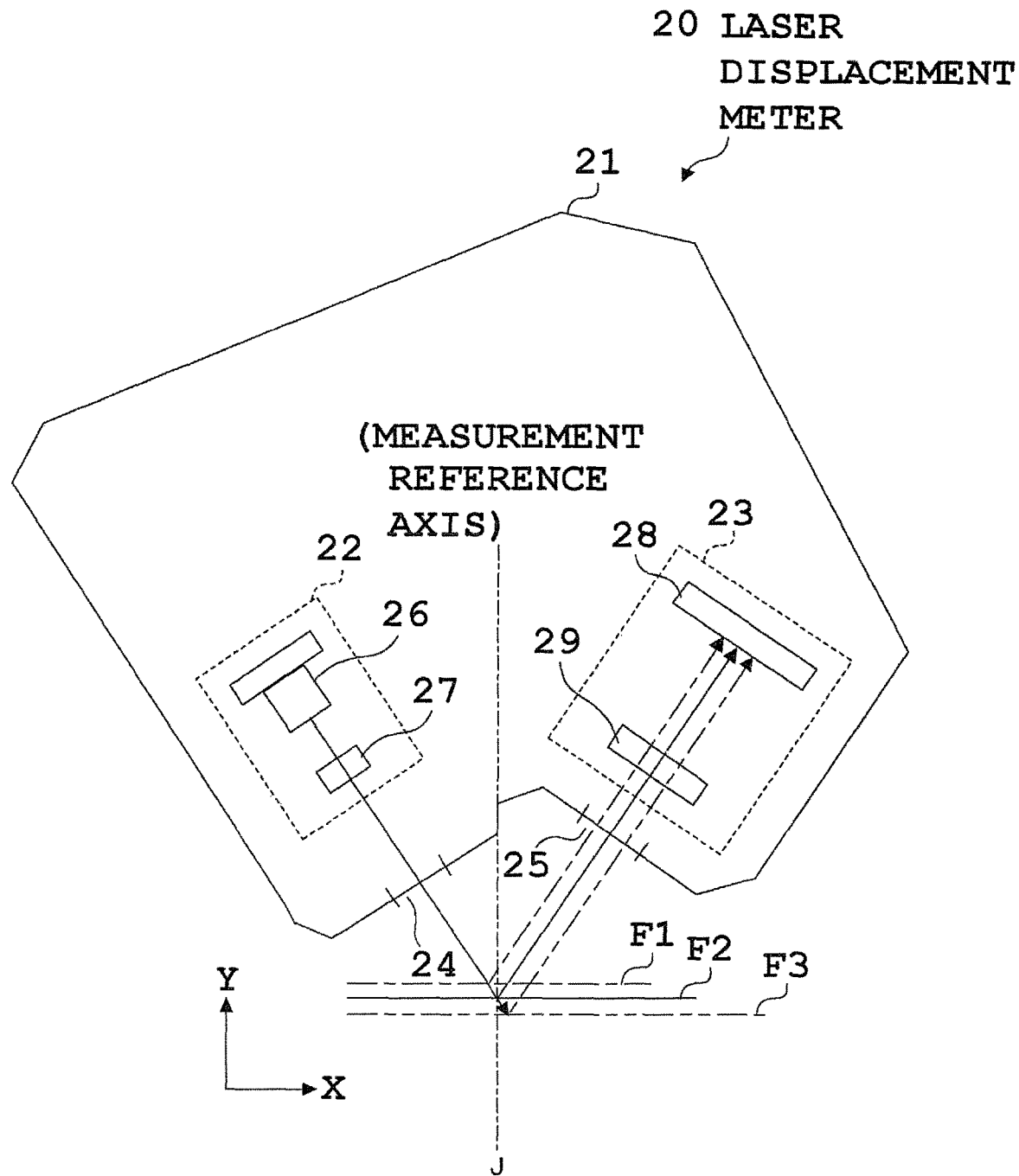
FIG. 3 is an outline view of a constitutional example of a laser displacement meter.

FIG. 3 is an outline view of a constitutional example of the laser displacement meter. According to the embodiment of the present invention, a non-contact laser displacement meter of a triangular ranging system is employed as the laser displacement meter 20. In terms of characteristics, for example, the non-contact laser displacement meter with a focal distance: 15 mm, a focal range: ±2.3 mm, and measurement accuracy: ±2.5° can be used.

The laser displacement meter 20 has a light projecting part 22 and a light receiving part 23 in a casing 21 that constitutes its body portion. A window part 24 for projecting light and a window part 25 for receiving light are provided on a front side of the casing 21. Further, wiring, etc. , are connected to a back side of the casing 21 for exchanging various signals and data (including a control signal for controlling an operation of the laser displacement meter 20, and measurement data of the laser displacement meter 20), between the laser displacement meter 20 and a control computer 30.

The light projecting part 22 is configured to project laser beams toward the edge of the lens 2 through the window part 24. The light projecting part 22 is constituted of a light emitting element 26 made of a semiconductor laser, and a light projecting lens 27 for example. A direction of the light projecting part 22 (optical axis) is inclined by an angle of 30° for example, relative to an axial line parallel to the Y-axis shown by one dot chain line in the figure.

Note that the one dot chain line in the figure indicates an axial line defined as follows when the laser beams projected from the light projecting part 22 of the laser displacement meter 20 is received by the light receiving part 23, using a plane parallel to the X-direction (also described as "X-plane" hereafter" as a reflection surface (mirror surface). Namely, when the laser displacement meter 20 is mounted on the lens shape measurement device 1, the direction of the laser displacement meter 20 is adjusted (fine adjustment) beforehand, so that the laser beams regular-reflected (mirror-reflected) by the X-plane are made incident on a detection reference position (for example, the center portion) of a previously set light position detecting element 28. In such a case, axial line J shown by one dot chain line in the figure indicates a virtual reference axis at the time of adjusting the direction of the laser displacement meter 20, and this reference axis intersects the X-plane, corresponding to the axial line passing through a regular reflection position (incidence position) on the X-plane. In the description hereafter, axial line J shown by one dot chain line in the figure is described as "a measurement reference axis of the laser displacement meter 20".

The light emitting element 26 is configured to emit laser beams. The light projecting lens 27 is configured to project the laser beams emitted from the light emitting element 26. The laser beams from the laser displacement meter 20 may be spot type laser beams. However, the position of the edge of the lens 2 being the measurement target is varied not only in the X-axis direction and the Y-axis direction but also in the Z-axis direction being the thickness direction of the lens. This is because an overall lens 2 is curved corresponding to a curvature of a convex surface and a concave surface of the lens 2. Further, positions of the bevel and the groove are also varied in the Z-axis direction corresponding to the curve of the lens 2. Therefore, when the edge of the lens 2 is irradiated with the spot type laser beams, an irradiation position of the laser beams is required to be moved in the Z-axis direction, or the lens 2 is required to be rotated multiple numbers of times and measured, to grasp a cross-sectional shape of the edge including the bevel and the groove formed on the edge.

Meanwhile, when line-shaped laser beams extending in the thickness direction of the lens 2 is emitted by the laser displacement meter 20, the cross-sectional shape of the edge can be measured with no necessity for moving the laser displacement meter 20 by the Z-axis moving system 5 even if the edge of the lens 2 is displaced in the Z-axis direction, provided that the displacement is within a range of a line length of the laser beams. Therefore, the shape and the dimension of the lens 2 can be speedily measured, compared with a case of utilizing the spot type laser beams. However, in a case of measuring a lens having particularly large edge thickness, the laser displacement meter 20 is moved in the Z-axis direction. From such a reason, preferably the laser displacement meter 20 emits the line-shaped laser beams extending in the thickness direction of the lens. Therefore, in this embodiment, the light projecting part 22 is configured to project the line-shaped laser beams which are parallel to the Z-direction and long in the Z-direction in FIG. 1.

The light receiving part 23 is configured to receive the laser beams reflected toward the window part 25. The light receiving part 23 is constituted of the light position detecting element 28 and a light receiving lens 29. The direction of the light receiving part 23 (optical axis) is inclined by an angle of 30° (the same angle as the optical axis of the light projecting part 22) for example, relative to the measurement reference axis of the laser displacement meter 20 (see FIG. 3).

The light position detecting element 28 is configured to detect the position of the light (laser beams reflected from the measurement target portion in this embodiment) which is made incident on a light detection surface, using a front surface of the light position detecting element 28 as the light detection surface. As the light position detecting element 28, for example, PSD (position sensitive detectors) capable of detecting the displacement of the incident light, can be used. The light receiving lens 29 is configured to guide the light entered into the casing 21 through the window part 25, to the light position detecting element 28.

(Measurement Principle of the Laser Displacement Meter)

A measurement principle of the laser displacement meter 20 will be described next.

First, as shown in FIG. 3, three planes at different positions in the Y-direction (described as "measurement planes" hereafter) are shown by F1, F2, F3 as portions to be measured. In this case, the measurement planes F1, F2, F3 are parallel to each other to become X-plane. Further, the measurement plane F1 exists at a position closest to the laser displacement meter 20, and the measurement plane F3 exists at a position farthest from the laser displacement meter 20.

In such a case, when the measurement planes F1, F2, F3 are respectively irradiated with laser beams obliquely from the light projecting part 22 of the laser displacement meter 20, the light reflected (regular reflection) by each of the measurement planes F1, F2, F3 is transmitted through the window part 25 and the light receiving lens 29 sequentially, and is incident on a light detection surface of the light position detecting element 28. At this time, an incident position of the light on the light detection surface of the light position detecting element 28 which is the light reflected by the measurement plane F1, an incident position of the light on the light detection surface of the light position detecting element 28, which is the light reflected by the measurement plane F2, and an incident position of the light on the light detection surface of the light position detecting element 28, which is the light reflected by the measurement plane F3, are different from each other. Namely, there is a variation in incident positions of the light on the light detection surface of the light position detecting element 28, which is the light reflected by the measurement surface.

Further, a value of measurement data outputted from the laser displacement meter 20 (for example, an output voltage value) is varied, with a variation of the incident positions of the light on the light detection surface of the light position detecting element 28. Accordingly, when the laser displacement meter 20 is operated, the separation distance between the laser displacement meter 20 and the measurement planes (F1, F2, F3) can be measured (detected) based on the measurement data outputted from the laser displacement meter 20. Further, when the measurement surface is displaced in the Y-direction, the value of the measurement data before/after displacement is also varied, and therefore the amount of the displacement can be measured (detected) based on a differential value of them.

(Structure of a Control System)

Figure 4:
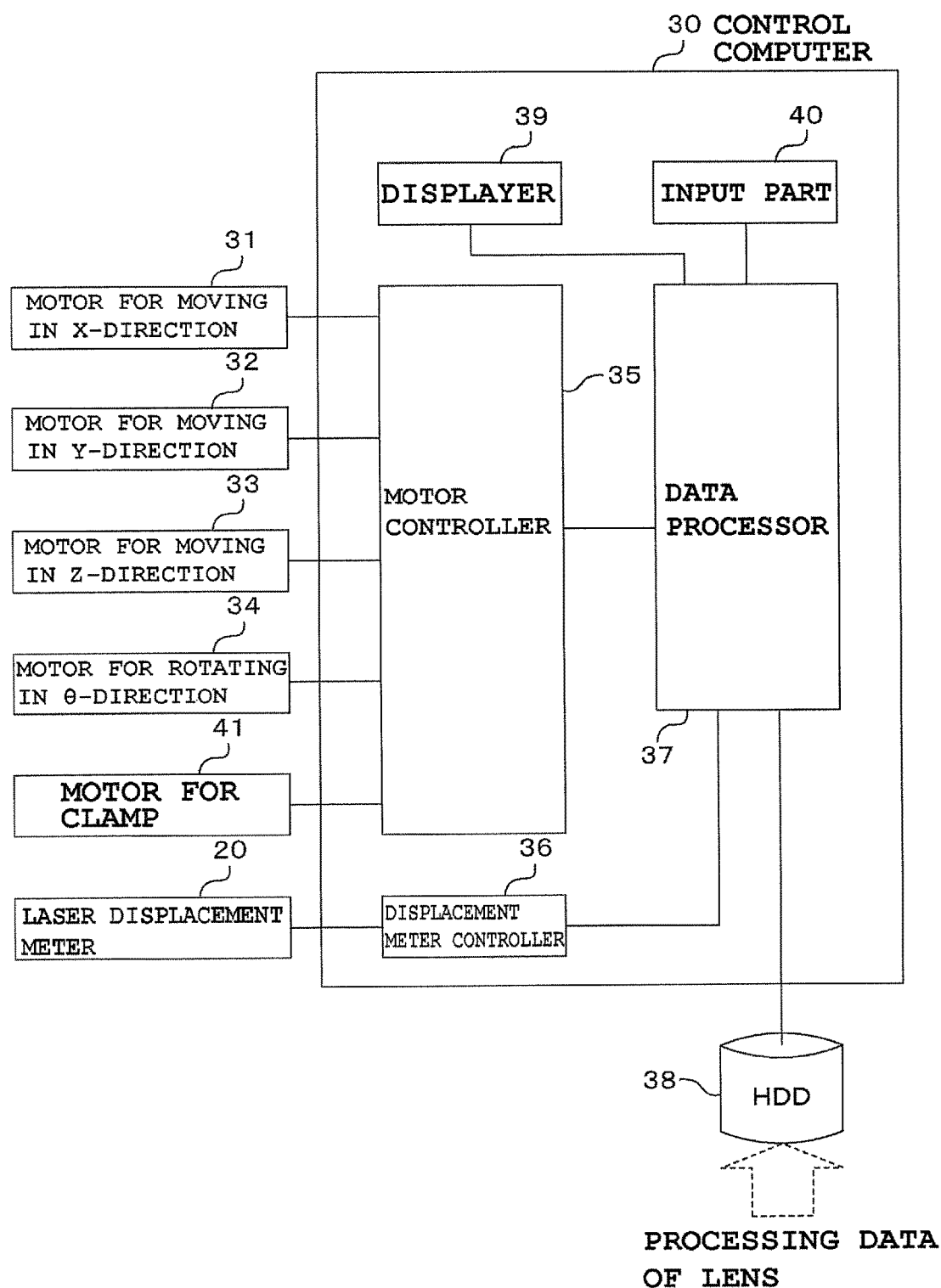
FIG. 4 is a block diagram of a constitutional example of a control system of the lens shape measurement device according to an embodiment of the present invention.

FIG. 4 is a block diagram of a constitutional example of a control system of the lens shape measurement device according to an embodiment of the present invention.

The control system of the lens shape measurement device 1 is mainly constituted of a control computer 30. A motor for movement in the X-direction (also described as a "X-moving motor" hereafter) 31, a motor for movement in the Y-direction (also described as a "Y-moving motor" hereafter) 32, a motor for movement in the Z-direction (also described as a "Z-moving motor" hereafter) 33, a motor for rotation in the θ-direction (also described as a "rotation motor" hereafter) 34, and a motor for clamping the lens (also described as a "clamp motor") are respectively electrically connected to the control computer 30 as control targets, in addition to the aforementioned laser displacement meter 20.

The X-moving motor 31 is a driving source for moving the laser displacement meter 20 in the X-direction. The Y-moving motor 32 is a driving source for moving the lens 2 set in the θ stage 12 in the Y-direction. The Z-moving motor 33 is a driving source for moving the laser displacement meter 20 in the Z-direction. The rotation motor 34 is a driving source for rotating the lens 2 set in the θ stage 12 in the θ-direction (the driving source of the rotary actuator 17). The clamp motor 41 is a driving source for clamping the lens 2 set in the θ stage 12 through the aforementioned holding tool. The clamp motor 41 is one constitutional element of the aforementioned supporting units.

Aforementioned plurality of motors (31, 32, 33, 34, 41) are respectively connected to the motor controller 35 possessed by the control computer 30. The motor controller 35 individually controls the operation of each motor by individually giving a motor driving signal to each motor (31, 32, 33, 34, 41). More specifically, the motor controller 35 controls rotation, halt, acceleration, deceleration, rotating direction, rotating speed, and rotating amount (rotating angle), etc., of each motor for example.

Further, the control computer 30 includes a displacement meter controller 36 that controls the laser displacement meter 20, and a data processing part 37 that processes each kind of data. The displacement controller 36 controls the operation of light projection and light reception of the laser displacement meter 20, and captures the measurement data outputted from the laser displacement meter 20 by such an operation, which is then given to the data processing part 37.

The data processing part 37 is provided as an example of the drive controller that controls drive of the X-axis moving system 3, the Y-axis moving system 4, the Z-axis moving system 5, and the θ-axis rotation system 6 that constitute the relative position altering unit". The data processing part 37 individually controls drive of the aforementioned plurality of motors (31, 32, 33, 34, 41) through the motor controller 35. Further, the data processing part 37 has not only a function as the drive controller, but also a function as "an information processor that captures position measurement information by the laser displacement meter 20 and information regarding an amount of movement of the relative position by the relative position altering unit (3, 4, 5, 6), to thereby obtain three-dimensional position information regarding the measurement target of the lens, and based on this three-dimensional position information, creates information regarding at least one of the shape and the dimension of the lens". Wherein, the three-dimensional information regarding the measurement target of the lens means the information specified by three-axial direction of X-axis, Y-axis, and Z-axis (namely, three-dimensional space). The three-dimensional position information is specified based on position information regarding the laser displacement meter 20 that moves in the X-axis direction by the X-axis moving system 3, position information regarding the lens 2 that moves in the Y-axis direction by the Y-axis moving system 4, and position information regarding the laser displacement meter 20 that moves in the Z-axis direction by the Z-axis moving system 5.

The data processor 37 performs various kind of data processing, using the measurement data captured from the displacement meter controller 36. The data processing executed by the data processor 37 includes processing of calculating a circumferential length of the lens, processing of creating lens shape data of the lens, processing of creating each kind of shape data regarding the edge of the lens, and processing of creating control data that controls the operation of the lens shape measurement device 1. The data processor 37 performs read and write of data by accessing a storage device (such as a hard disc (HDD)) 38 having large capacity. The storage device 38 stores beforehand a design value and the lens shape data as processing data. In a structure shown in the figure, it appears that the storage device 38 exists outside of the control computer 30. However, the storage device 38 may exist inside of the control computer 30. Further, although not shown, the storage device 38 may be attached to other personal computer and a server device, and other communication device connected to the control computer 30 via a network so as to enable a bidirectional communication.

The control computer 30 has a displayer 39 and an input part 40. Although the displayer 39 is used for mainly displaying a measurement result of the lens, it can be used for other purpose of use in some cases. The displayer 39 is constituted of a touch panel, etc., for example. Although the input part 40 is mainly used for inputting data required for measuring the lens or setting a measurement condition, etc., it can be used for other purpose of use in some cases. The input part 40 is constituted of a switch, a button, a key, and mouse, etc., for example. The motor controller 35, the displacement meter controller 36, and the data processor 37 of the constitutional elements of the control computer 30, are constituted by combining computer hardware such as memories (storage elements) like CPU (Central Processing Unit), RAM (Random Access Memory), and ROM (Read-Only Memory), and each function is realized by executing a program stored in the memory by the CPU.

<2. Operation of the Lens Shape Measurement device>

The operation of the lens shape measurement device 1 according to an embodiment of the present invention will be described next.

(Basic Operation)

First, when the X-moving motor 31, the Y-moving motor 32, the Z-moving motor 33, and the rotation motor 34 are driven, the lens shape measurement device 1 is operated as follows.

The operation in a case of driving the X-moving motor 31;

When the X-moving motor 31 is driven, the stage 9A of the X-axis stage unit 9 is moved to one or the other direction of the X-direction. At this time, the moving direction, the moving speed, and the moving amount of the stage 9A correspond to the rotating direction, the rotating speed, and the rotating amount of the X-moving motor 31.

Operation in a case of driving the Y-moving motor 32;

When the Y-moving motor 32 is driven, the stage 10A of the Y-axis stage unit 10 is moved in one or the other direction of the Y-direction. At this time, the moving direction, the moving speed, and the moving amount of the stage 10A correspond to the rotating direction, the rotating speed, and the rotating amount of the Y-moving motor 32.

Operation in a case of driving the Z-moving motor 33;

When the Z-moving motor 33 is driven, the stage 11A of the Z-axis stage unit 11 is moved in one or the other direction of the Z-direction. At this time, the moving direction, the moving speed, and the moving amount of the stage 11A correspond to the rotating direction, the rotating speed, and the rotating amount of the Z-moving motor 33.

Operation in a case of driving the rotation motor 34;

When the rotation motor 34 is driven, the θ-stage is moved in one or the other direction of the θ-direction. At this time, the rotating direction, the rotating speed, and the rotating amount of the θ-stage 12 correspond to the rotating direction, the rotating speed, and the rotating amount of the rotation motor 34.

Further, when the lens shape measurement device 1 is operated as described above in a state of setting the lens 2 in the θ-stage 12, the relative position relation between the lens 2 and the laser displacement meter 20 is varied as follows.

Relative position in a case of driving the X-moving motor 31;

When the X-moving motor 31 is driven, the laser displacement meter 20 is moved in the X-direction, following a movement of the stage 9A of the X-axis stage unit 9. Therefore, the relative position between the lens 2 and the laser displacement meter 20 is varied in the X-direction.

When the lens 2 is actually measured, the position of the laser displacement meter 20 in the X-direction needs to be reflected on the measurement result. Therefore, the X-axis moving system 3 includes a first position detecting sensor for recognizing whether the laser displacement meter 20 exists at any position in the X-direction. Then, a detection result of the first position detecting sensor is captured by the data processor 37, so that the position of the laser displacement meter 20 can be recognized at real time.

Relative position in a case of driving the Y-moving motor 32;

When the Y-moving motor 32 is driven, the lens 2 is moved in the Y-direction following the movement of the stage 10A of the Y-axis stage unit 10. Therefore, the relative position between the lens 2 and the laser displacement meter 20 is varied in the Y-direction. Further, when the Y-moving motor 32 is driven from a state of FIG. 1, the lens 2 is moved in a direction of approaching and separating to/from the laser displacement meter 20. Therefore, the separation distance from the edge (outer peripheral surface) of the lens 2 to the laser displacement meter 20 is varied (increased or decreased).

When the lens 2 is actually measured, not only the focal distance, etc., of the laser displacement meter 20 but also the position of the lens 2 in the Y-direction (for example, the position of a rotation axis of the lens 2) needs to be reflected on the measurement result. Therefore, the Y-axis moving system 4 includes a second position detecting sensor for recognizing whether the lens 2 exists at any position in the Y-direction. Then, the detection result of the second position detecting sensor is captured by the data processor 37, so that the position of the lens 2 can be recognized at real time.

Relative position in a case of driving the Z-moving motor 33;

When the Z-moving motor 33 is driven, the laser displacement meter 20 is moved in the Z-direction following the movement of the stage 11A of the Z-axis stage unit 11. Therefore, the relative position between the lens 2 and the laser displacement meter 20 is varied in the Z-direction.

When the lens 2 is actually measured (particularly measurement regarding the shape of the edge of the lens 2), the position of the laser displacement meter 20 in the Z-direction needs to be reflected on the measurement result. Therefore, the Z-axis moving system 5 includes a third position detecting sensor for recognizing whether the laser displacement meter 20 exists at any position in the Z-direction. Then, the detection result of the third position detecting sensor is captured by the data processor 37, so that the position of the laser displacement meter 20 can be recognized at real time.

Relative position in a case that the rotation motor 34 is driven;

When the rotation motor 34 is driven, the lens 2 is rotated together with the θ-stage 12. Therefore, the direction of the lens 2 in the edge direction with respect to the lens displacement meter 20 is varied in the θ-direction. At this time, an axis passing through a rotation center of the lens 2 is a "rotation axis (θ-axis)". Further, if the lens shape of the lens 2 is a true circular shape, the separation distance from the edge of the lens 2 to the laser displacement meter 20 is not varied even if the lens 2 is rotated by driving the rotation motor 34. Meanwhile, when the lens shape of the lens 2 is a shape close to an elliptical shape or a rectangle, the separation distance from the edge of the lens 2 to the laser displacement meter 20 is varied when the lens 2 is rotated by driving the rotation motor 34.

Next, explanation will be given for an operation procedure (including a lens shape measurement method) in a case that measurement is performed using the lens shape measurement device 1 which is operated as descried above. The lens 2 is measured using the edging data used for edging the lens 2. The edging data of the lens 2 described here, is the data for two-dimensionally showing the lens shape as shown in Japanese Patent Laid Open Publication No. 1993-111862, and is the data for defining the outer peripheral shape of the lens in a polar coordinate in which a prescribed reference position of the lens 2 is set as a pole.

<3. Operation Procedure of Measuring a Lens Shape in a Case of Utilizing the Edging Data>

Figure 5:
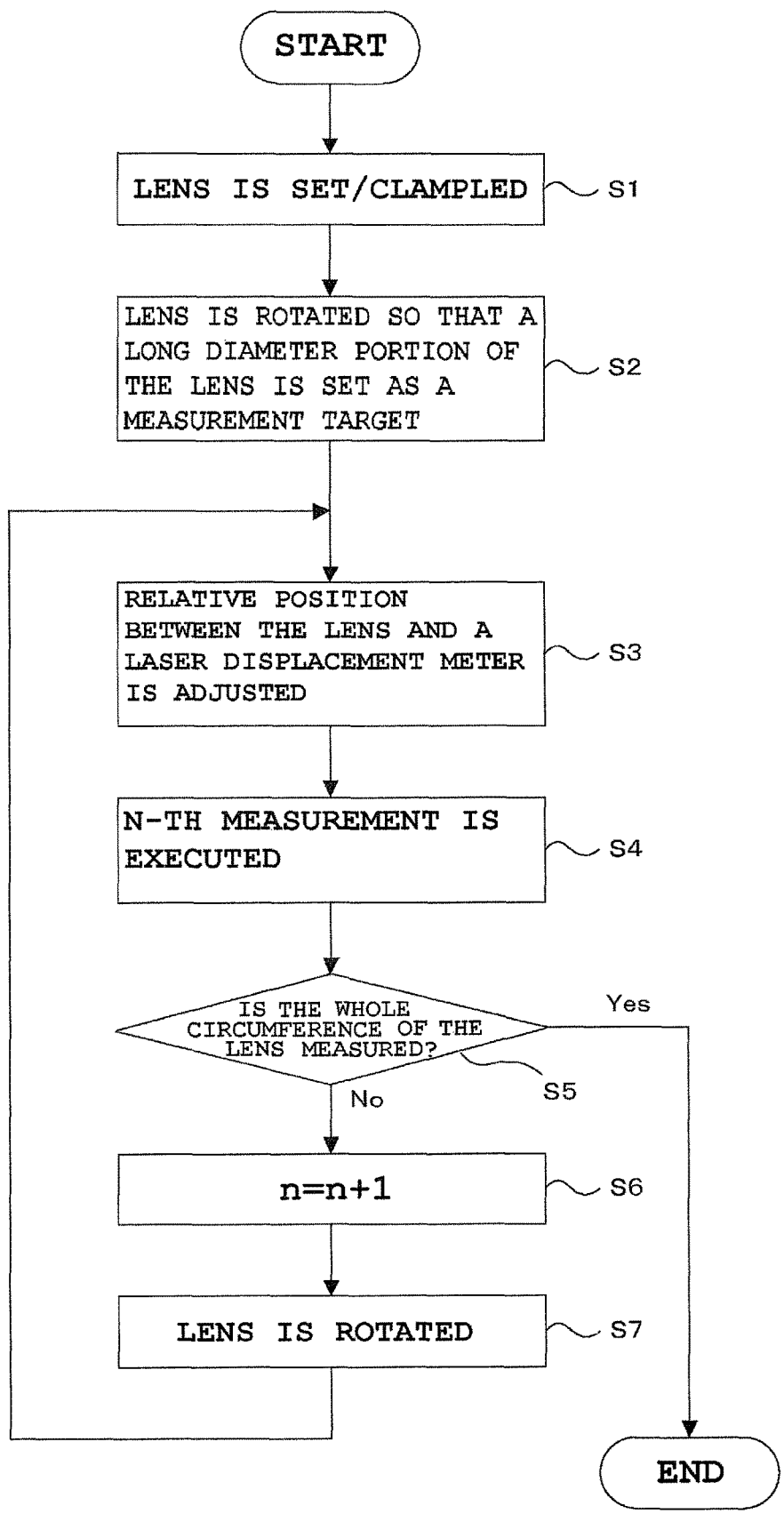
FIG. 5 is a flowchart showing an operation procedure of a lens shape measurement in a case that edging data of a lens is utilized.

FIG. 5 is a flowchart showing an operation procedure of measuring a lens shape in a case of utilizing the edging data of the lens.

(Precondition)

Explanation will be given hereafter on the assumption that the edging data is stored in the storage device 38 as virtually shown in FIG. 4, prior to start of measuring the lens 2, and is read therefrom and utilized by the data processor 37 as needed.

Explanation will be further given based on following preconditions.

Figure 6:
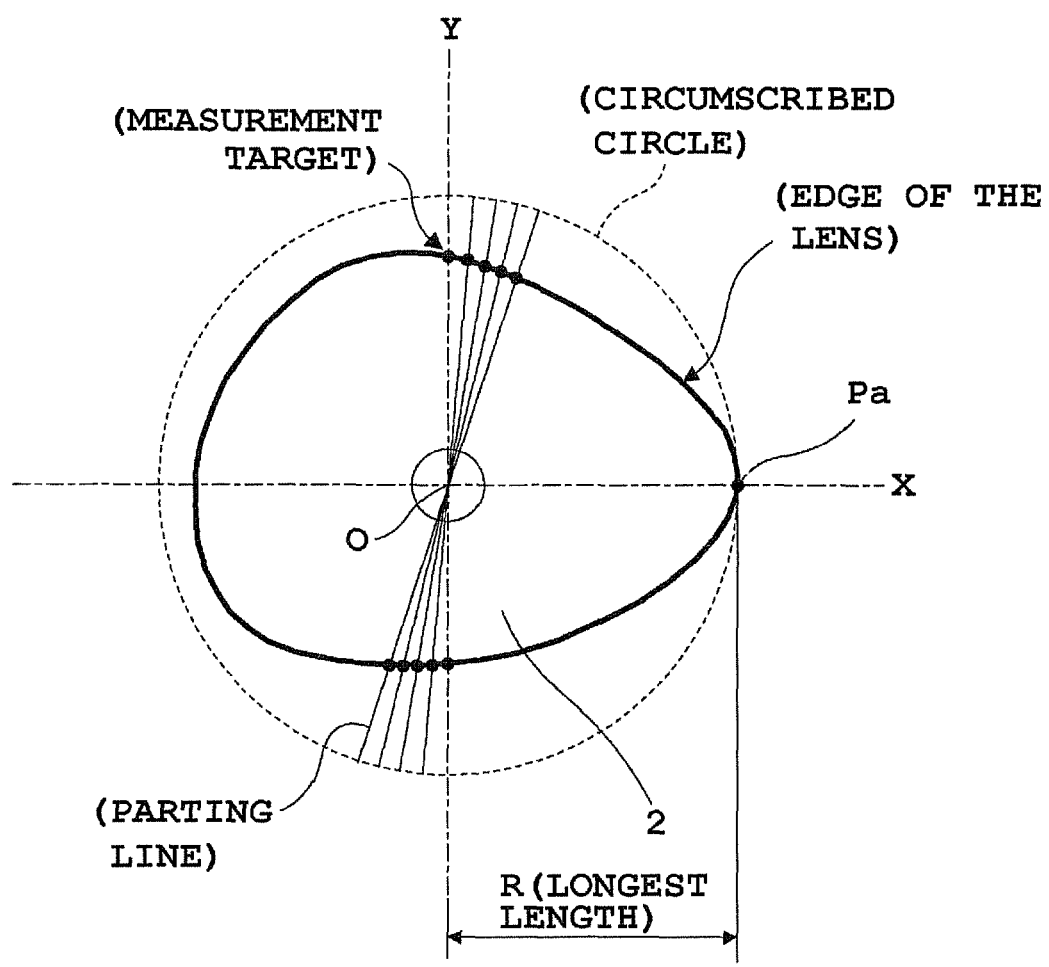
FIG. 6 is a plane view describing a setting example of a measurement target.

Namely, the whole circumference of the edge of the lens 2 is divided at previously set angle pitches in the θ-direction, and measurement by the laser displacement meter 20 is repeatedly performed in accordance with the number of divisions. For example, when a plurality of measurement targets are set on the edge of the lens 2, as shown in FIG. 6, a circumscribed circle of the lens 2 is divided at equal angle pitches, and the measurement targets (shown by black circles in the figure) are set on each divided line that crosses the edge of the lens 2.

When a light quantity received by the light receiving part 23 is increased, the value of the measurement data of the laser displacement meter 20 (an output voltage value, and also described as a "measurement value" in this example) becomes large accordingly, and when a light receiving amount by the light receiving part 23 is reduced, it becomes small accordingly.

Further, as described above, it is assumed that line-shaped laser beams are projected from the light projecting part 22 of the laser displacement meter 20. Then, the whole part of the edge of the lens 2 in the thickness direction of the lens 2, is settled within a range of a line length of the laser beams, and this state is maintained over the whole circumference of the lens 2.

Incidentally, in a case that the convex surface and the concave surface of the lens 2 have deep curves, and in a case of a lens having a large deflection in the Z-axis direction, it can be considered that a part or the whole part of the edge of the lens 2 is deviated from a laser irradiation range in a middle of a rotation of the lens 2. In such a case, the Z-moving motor 33 is vertically driven by the data processor 37 so that the edge of the lens 2 is not deviated from the laser irradiation range, to thereby move (displace) the laser displacement meter 20 suitably in the Z-direction.

(Actual Operation Procedure)

Step S1;

First, the lens 2 is set in the θ-stage 12 and is clamped thereby. A setting work of the lens 2 is performed artificially, and clamp of the lens 2 is performed by driving the aforementioned clamp motor 41. At this time, the lens 2 is mounted on the holding tool of a edging device as described above, and is set in the θ-stage 12 with the holding tool attached thereto after end of the processing. Further, the lens 2 is positioned and attached onto the θ-stage 12 so that the supporting center O of the lens 2 and the rotation center of the stage 12 are matched with each other. Positioning of the lens 2 is performed by the aforementioned positioning units. Further, the direction of the lens 2 in the Z-direction is as follows. The holding tool is air-tightly held by the convex surface of the lens 2, and the lens 2 is attached to the θ-stage 12 with its concave surface directed upward. At this time, the lens 2 and the holding tool are fixed to each other by adhesion using a double-sided tape made of urethane so as not to damage the surface of the lens 2. However, the present invention is not limited thereto, and the lens 2 may be fixed to the holding tool by vacuum adsorption utilizing a suction cup.

Figure 7:
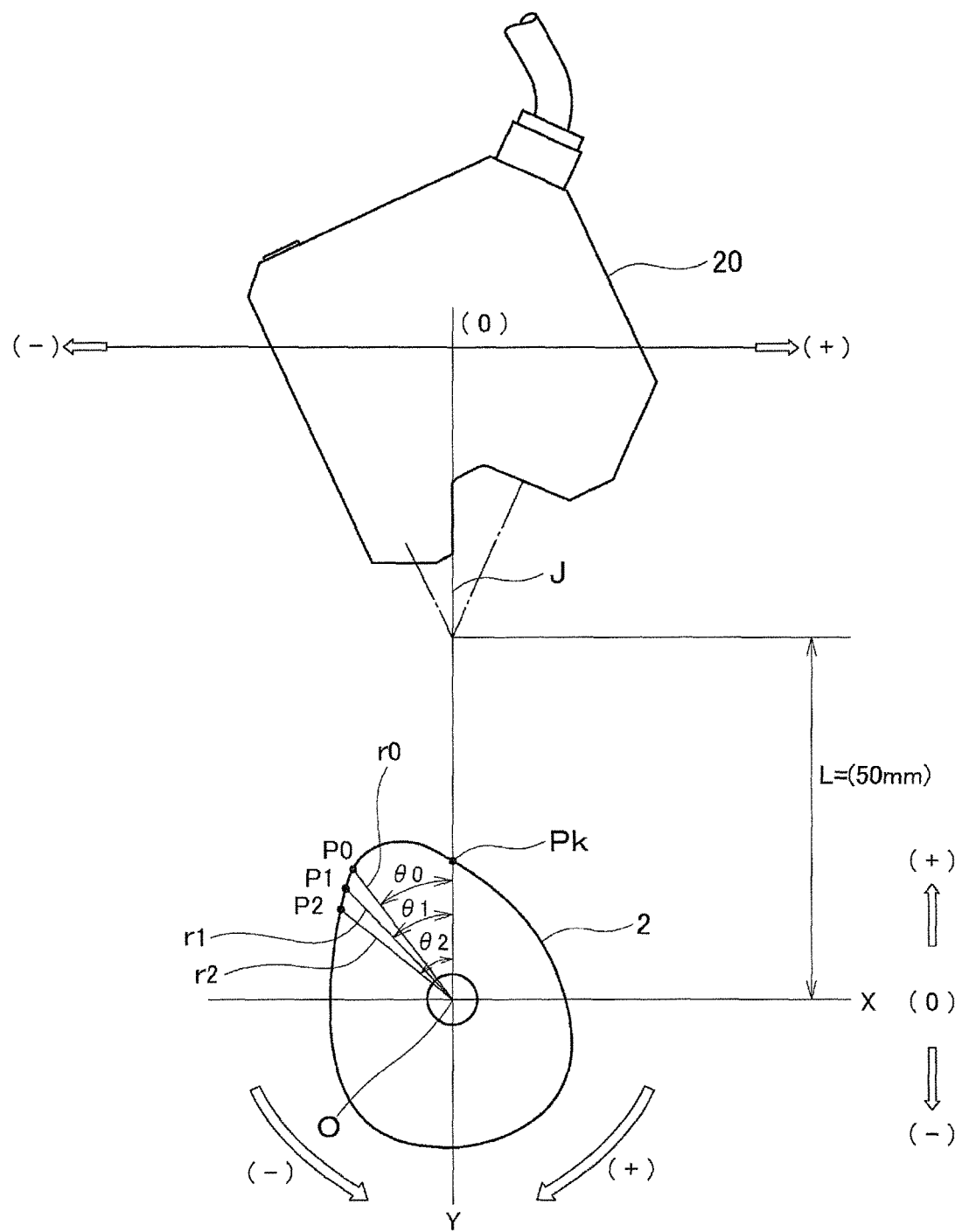
FIG. 7 is a plane view of a home position of each part of the lens shape measurement device.

Further, when the lens 2 is set in the θ-stage 12, each part of the lens shape measurement device 1 is disposed at a previously set initial position (described as a "home position" hereafter) prior to setting of the lens 2 in the θ-stage 12. For example, FIG. 7 shows a state that each part of the lens shape measurement device 1 is disposed in the home position. Namely, the laser displacement meter 20 is disposed in a state that its measurement reference axis J coincides with the Y-axis passing through the rotation center of the lens 2. Further, the θ-stage 12 is disposed in a state of securing a sufficient distance between the lens 2 and the laser displacement meter 20 so that the lens 2 is not brought into contact with the laser displacement meter 20 in the middle of the rotation (for example, a distance of 50 mm from the supporting center O of the lens 2 to the focal position of the laser displacement meter 20 as shown in the figure).

Step S2;

Next, the lens 2 is rotated so that a long diameter portion of the lens 2 is the measurement target (measurement position), using the edging data stored in the storage device 38. At this time, the data processing part 37 controls the drive of the Y-moving motor 32 and the rotation motor 34 so that the rotation of the lens 2 is stopped in a state that the long diameter portion of the lens 2 is set on the measurement reference axis of the laser displacement meter 20. As shown in FIG. 6, the long diameter portion of the lens 2 is a portion with a longest radius distance r (described as "long diameter portion Pa" hereafter) in radius vector (r, θ) indicating the lens shape.

In rotating the lens 2 as described above, the lens 2 is rotated by drive of the rotation motor 32 from a state that each part of the lens shape measurement device 1 is set at a home position, and the lens 2 is moved so as to gradually approach the laser displacement meter 20 by the drive of the Y-moving motor 32.

Figure 8:
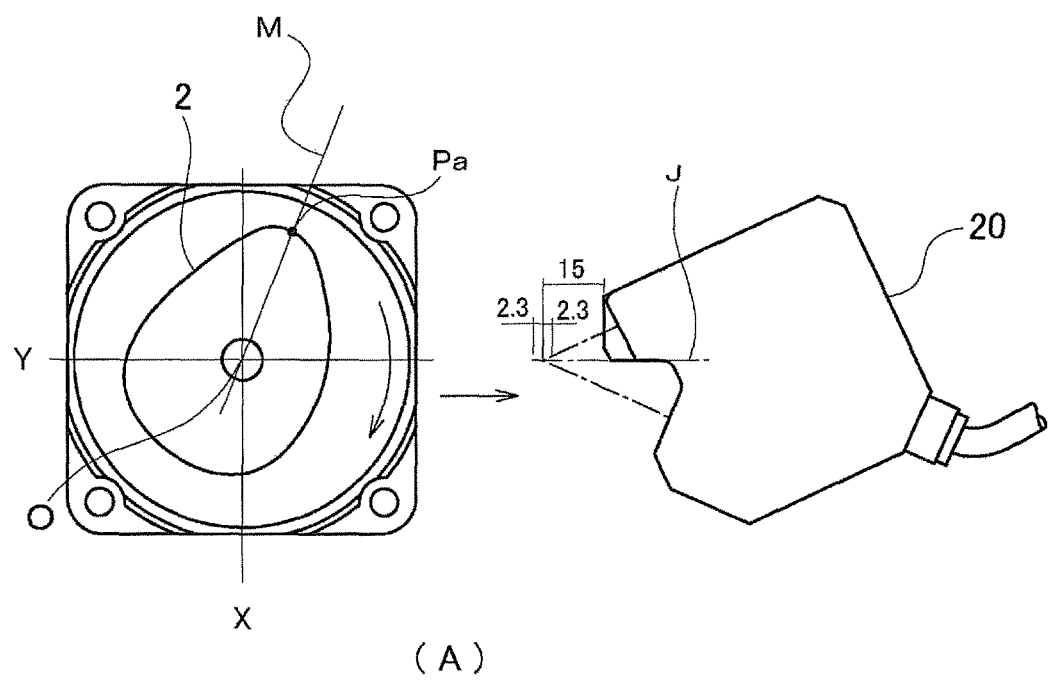
FIG. 8 is a view (1) describing an operation example of the lens shape measurement device.
Figure 8:
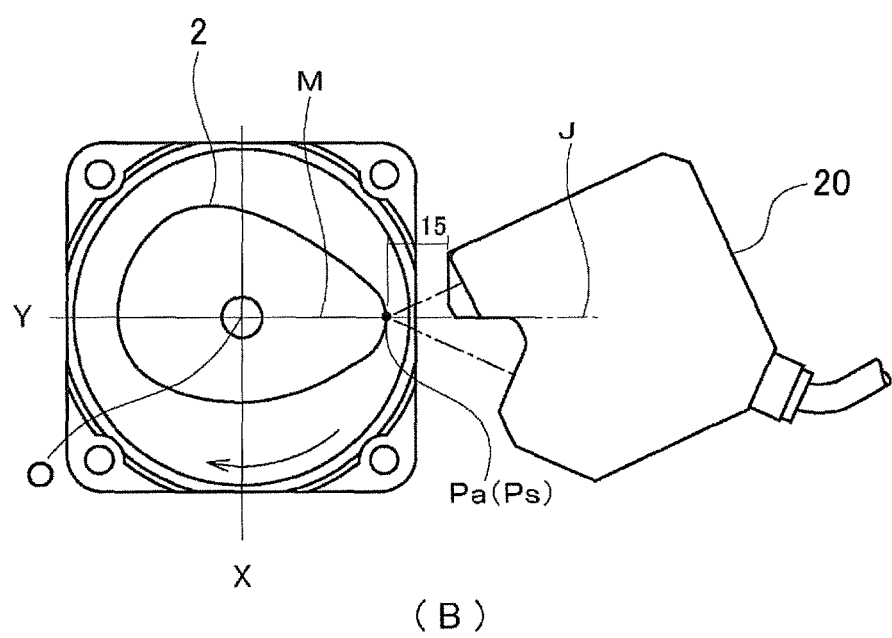

Then, there is a moment when a long diameter portion Pa of the lens 2 passes through the focal position of the laser displacement meter 20, in the middle of approaching the laser displacement meter 20. Then, at this moment, a measurement value of the laser displacement meter 20 is greatly changed. For example, as shown in FIG. 8(A), the lens 2 is approached to the laser displacement meter 20 by the drive of the Y-moving motor 32, while rotating the lens 2 in a clockwise direction. Then, as shown in FIG. 8 (B), the measurement value of the laser displacement meter 20 is greatly changed when the long diameter portion Pa of the lens 2 reaches the focal position of the laser displacement meter 20 (for example, the position of 15 mm from an end face portion being a reference of the laser displacement meter 20). The reason thereof will be described hereafter.

First, when the lens 2 passes through the focal position of the laser displacement meter 20, the laser beams projected from the light projecting part 22 is reflected by the long diameter portion Pa of the lens 2, and such a reflected light is received by the light receiving part 23. Particularly, in the rotating direction of the lens 2 (θ-stage 12), there is a moment when a normal line passing through the long diameter portion Pa of the lens 2 (line vertical to a tangential line) M is overlapped on the Y-axis passing through the supporting center O of the lens 2, and at this moment, the measurement value of the laser displacement meter 20 becomes maximum. This is because at this moment, when the long diameter portion Pa of the lens 2 is used as the measurement part Ps and an incidence angle and a reflection angle of the laser beams passing through the long diameter portion Pa of the lens 2 are defined as the center of the normal line M, these angles are approximately equal to each other, thus realizing a state that the laser beams reflected by the measurement target Ps can be most efficiently received. In such a state, in the laser beams made incident on the long diameter portion Pa of the lens 2, regularly reflected light from the light projecting part 22 of the laser displacement meter 20 advances to the light receiving part 23 of the laser displacement meter 20. Therefore, light quantity received by the light receiving part 23 is increased, compared with a case that the normal line passing through the measurement target Ps of the edge of the lens 2 is inclined relative to the Y-axis, and the measurement value of the laser displacement meter 20 is also increased accordingly.

Further, when the bevel or the groove is formed on the edge of the lens 2, the measurement value of the laser displacement meter 20 is varied in accordance with a convex/concave shape of the edge of the lens 2. This is because when the bevel (convex portion) or the groove (concave portion) is formed on the edge of the lens 2, the distance from the edge of the lens 2 to the laser displacement meter 20 is varied at the position where the bevel or the groove is formed, and at the other portion.

Meanwhile, main light beam of the laser beams reflected by the edge of the lens 2 is deviated from the light receiving part 23 of the laser displacement meter 20, or the edge of the lens 2 opposed to the laser displacement meter 20 is deviated from the focal position of the laser displacement meter 20, slightly before or slightly after the long diameter portion Pa of the lens passes through the focal position of the laser displacement meter 20. Therefore, even if the laser beams are projected from the light projecting part 22, the laser beams are not received so much by the light receiving part 23. Accordingly, the measurement value of the laser displacement meter 20 is a smaller value than the long diameter portion Pa.

As described above, a state shown in FIG. 8(B) (a state that the long diameter portion Pa of the lens 2 is set as a measurement target portion Ps) can be obtained by halting the rotation of the lens 2 under a condition that the measurement value of the laser displacement meter 20 becomes the maximum value.

Step S3;

Next, the relative position between the lens 2 and the laser displacement meter 20 is adjusted so as to satisfy the following two conditions.

(First Condition)

Figure 9:
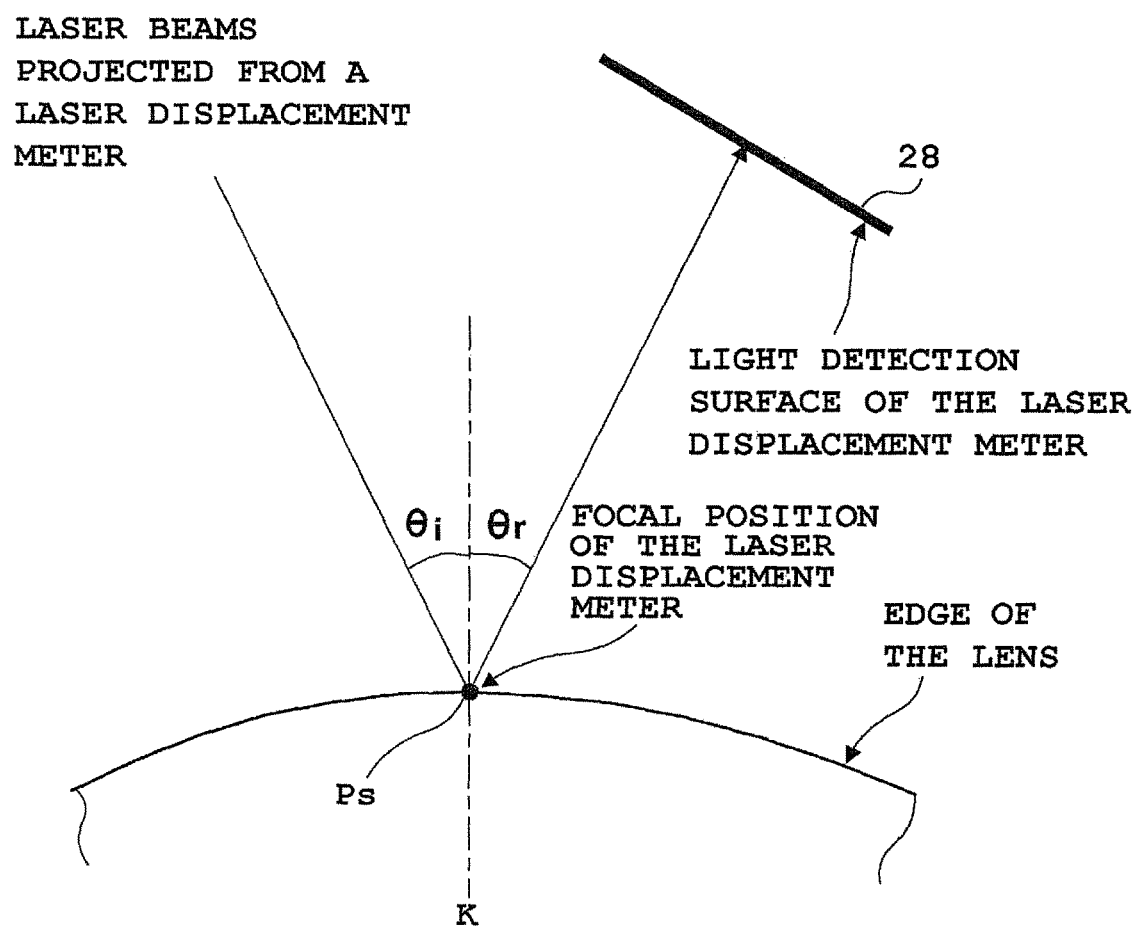
FIG. 9 is a view (2) describing an operation example of the lens shape measurement device.

A mirror reflection state should be made as shown in FIG. 9, which is a reflection state that an incidence angle θi and a reflection angle θr are the same angles relative to the measurement target Ps, with a normal line K set as a reference (center) which passes through the measurement target Ps of the lens 2.

In order to satisfy the first condition, the lens 2 needs to be rotated in the θ-direction by driving the rotation motor 34. The direction of the normal line passing through the measurement target Ps of the lens 2 is different, depending on which position is used as the measurement target portion on the edge of the lens 2.

(Second Condition)

The focal position of the laser displacement meter 20 should coincide with the measurement target portion Ps of the lens 2 as shown in FIG. 9.

In order to satisfy the second condition, the laser displacement meter 20 needs to be moved by driving the X-moving motor 31, and the lens 2 needs to be moved in the Y-direction by driving the Y-moving motor 32.

More specifically, when the lens 2 is rotated in the step S2 and when the normal line M passing through the long diameter portion of the lens 2 has an inclination relative to a measurement reference axis J of the laser displacement meter 20 as shown in FIG. 8(A) and FIG. 8(B), the rotating direction of the lens 2 is adjusted so that the inclination is eliminated (so that the normal line M passing through the long diameter portion of the lens and the measurement reference axis J of the laser displacement meter 20 are parallel to each other). Further, when the inclination of the lens 2 is adjusted, the position of the long meter portion of the lens 2 is also deviated in accordance with an adjustment amount. Therefore, when the position of the long meter portion of the lens 2 is deviated, the position of the laser displacement meter 20 is also adjusted accordingly. The adjustment of the direction of the lens 2 is performed by the data processor 37 by controlling the drive of the rotation motor 34 through the motor controller 35. Further, the adjustment of the position of the laser displacement meter 20 is performed the data processor 37 by controlling the drive of the Y-moving motor 32 through the motor controller 35.

Further, the adjustment of the relative position between the lens 2 and the laser displacement meter 20 is performed by the data processor 37 by controlling the drive of the X-moving motor 31, the Y-moving motor 32, and the rotation motor 34 through the motor controller 35.

Wherein, in order to satisfy the aforementioned two conditions, control data for driving the X-moving motor 31, the Y-moving motor 32, and the rotation motor 34, is created by the data processor 37 using the edging data of the lens 2 read from the storage device 38. In the data processor 37, the control data for satisfying the aforementioned two conditions can be obtained based on a geometrical calculation formula, etc., for example if only the edging data of the lens 2 is provided. Specific examples will be given hereafter for explanation.

Figure 10:
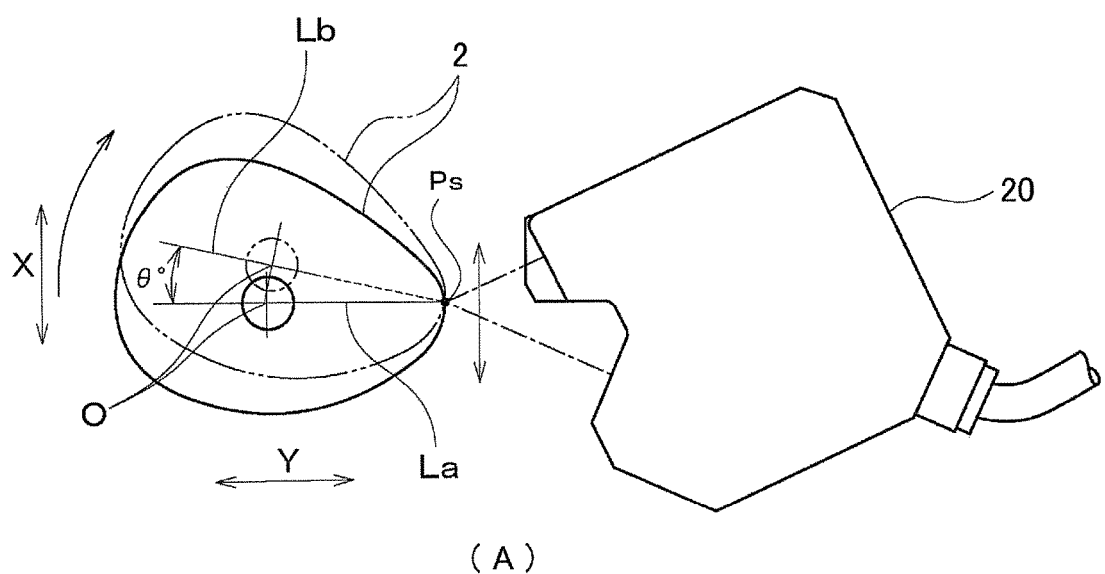
FIG. 10 is a schematic view describing a state during measurement of the lens shape.
Figure 10:
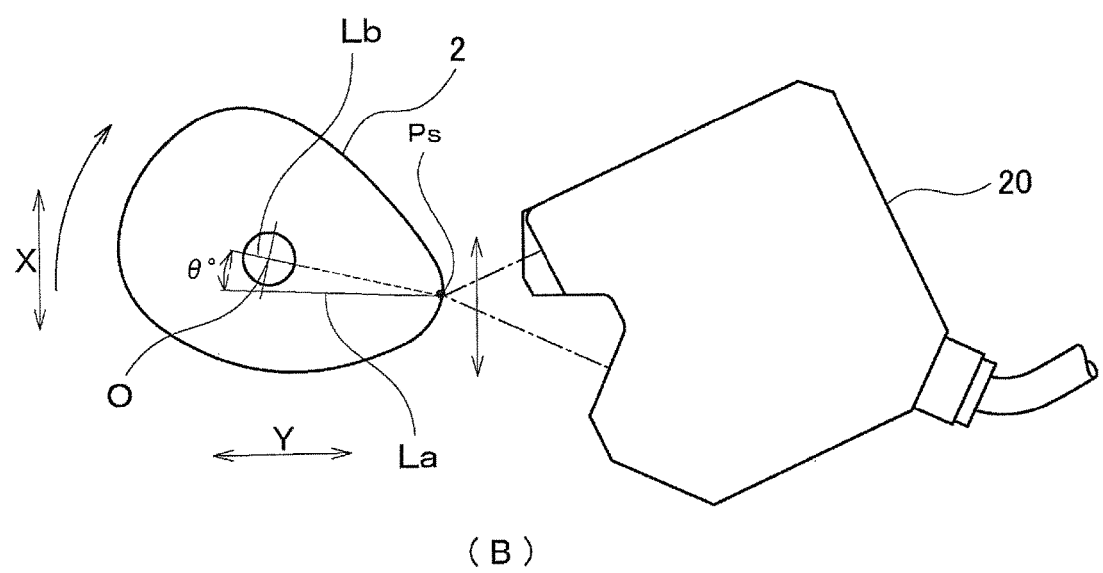

First, when the lens 2 is set in the θ-stage 12, it is assumed that the relative position between the lens 2 and the laser displacement meter 20 is set in a relation shown in FIG. 10(A) for example.

In this figure, solid line indicates the position of the lens 2 before rotating the lens, and angle θ° defined by dot line indicates a rotation angle of the lens 2, and two dot chain line indicates the position of the lens 2 after rotation.

When the lens 2 is set in a state shown by the solid line in the figure, the state satisfying the first condition (condition of the reflection in which the incidence angle θi and the reflection angle θr of the laser displacement meter 20 are equal to each other relative to the measurement target Ps) can be obtained. However, the lens 2 cannot be rotated around the position Ps in terms of the structure of the lens shape measurement device 1. Note that FIG. 10 (B) shows a state after the lens 2 is rotated as described above. Further, in FIG. 10 (A), (B), axial line connecting the supporting center O of the lens 2 and the measurement target Ps of the lens 2 is indicated by La, Lb, wherein the axial line before rotation of the lens 2 is indicated by La, and the axial line after rotation of the lens 2 is indicated by Lb.

In the lens shape measurement device 1 according to the embodiment of the present invention, a rotating operation of the lens 2 is realized by driving three axes of X-axis, Y-axis, and θ-axis. Explanation will be given specifically hereafter.

First, positioning units are provided to the θ-stage 12 that rotates in the θ-direction, for determining the position in the rotating direction of the holding tool that holds the lens 2. Therefore, when the lens 2 is set in the θ-stage 12, a rotational position of the holding tool in the rotating direction of the lens 2 is uniquely determined in a stage of setting the lens 2 in the θ-stage 12.

Further, as one of sensor functions possessed by the lens shape measurement device 1, when the lens 2 is rotated by the drive of the rotation motor 34 for example, the home position in the rotating direction is designed to be detected using a rotating position sensor not shown. Further, a detection result of the rotating position sensor is captured by the data processor 37, and based on the detection result, arrangement of the lens 2 at the home position can be detected by the data processor 37. Thus, in the data processor 37, when the lens 2 is rotated from the home position in the rotating direction, how much the lens 2 is rotated from the home position can be grasped based on a rotation amount of the rotation motor 34 (for example, the number of pulse for driving a pulse motor, if the rotation motor 34 is the pulse motor).

Wherein, as shown in FIG. 7 for example, three points connected on the edge of the lens 2 are indicated by P0, P1, P2 respectively for the convenience of explanation. Further, one point on the edge of the lens 2 is indicated by Pk, which is the point positioned on the Y-axis in a state of FIG. 7. In this case, positions P0, P1, P2 are expressed by polar coordinates as follows, in which the supporting center O of the lens 2 is set as a pole.

P0=(R0, θ0)

P1=(r1, θ1)

P2=(r2, θ2)

r0 indicates the radius distance from the supporting center O (an intersection point of the X-axis and the Y-axis) to point P0, and r1 indicates the radius distance from the supporting center O of the lens 2 to point P1, and r3 indicates the radius distance from the supporting center O of the lens 2 to point P2. Further, θ0 indicates an angle relative to the Y-axis formed by a line segment connecting the supporting center O of the lens 2 and the point P0, and θ1 indicates an angle relative to the Y-axis formed by a line segment connecting the supporting center O of the lens 2 and the point P1, and θ2 is an angle relative to the Y-axis formed by a line segment connecting the supporting center O of the lens 2 and the point P2.

In FIG. 7, the X-axis and the Y-axis cross each other at the rotation center of the lens 2, and such an intersection is the pole of the polar coordinates. Then, a direction approaching the laser displacement meter 20 is defined as a positive (+) direction of the Y-direction, and a direction moving away from the laser displacement meter 20 is defined as a negative (−) direction of the Y-direction. Further, a right direction in the figure is defined as the positive direction, and a left direction in the figure is defined as the negative direction. In addition, in the rotating direction of the lens 2, a clockwise direction is defined as the positive direction, and a counter-clockwise direction is defined as the negative direction.

Figure 11:
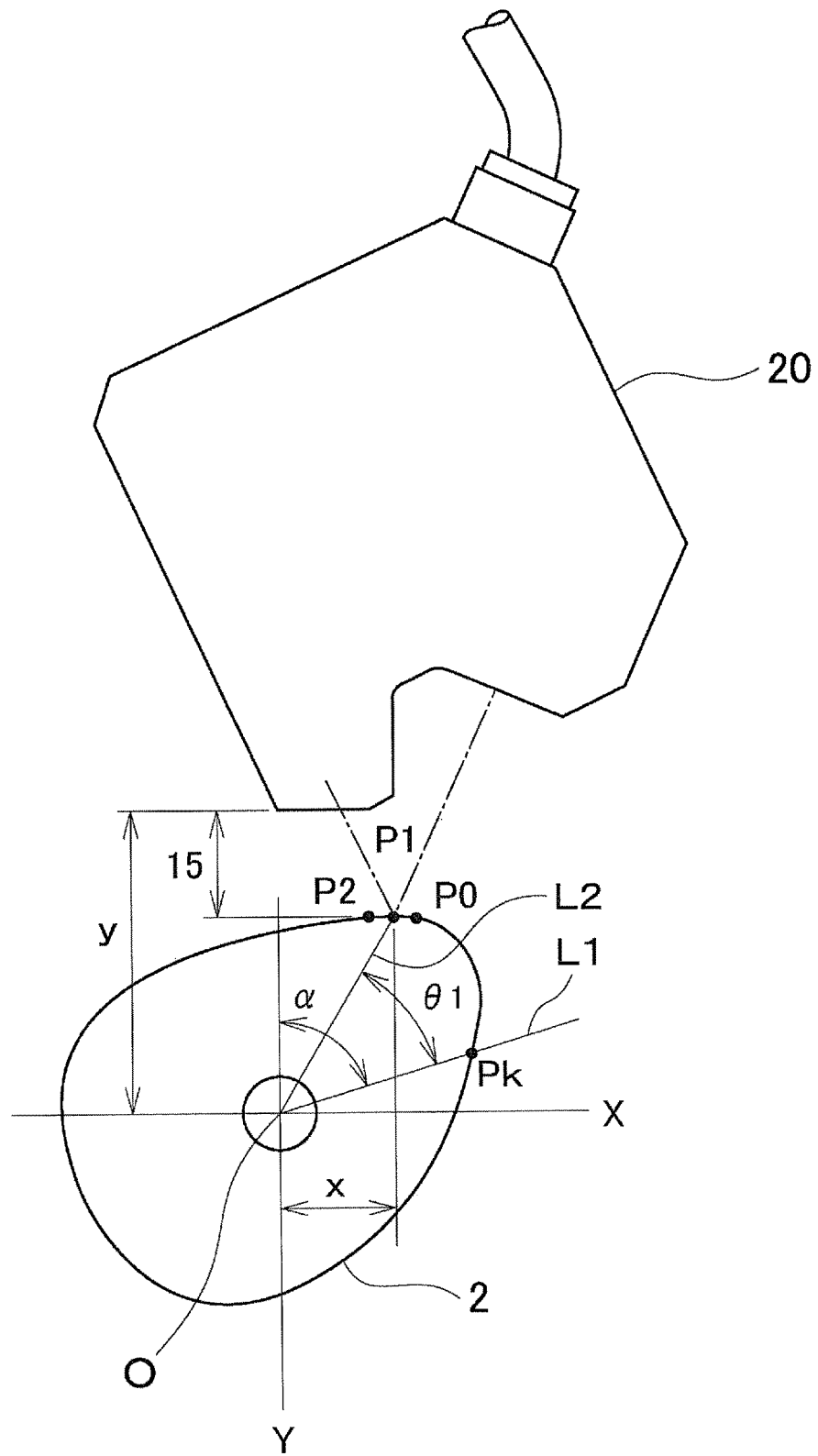
FIG. 11 is a plane view describing an adjustment example of a relative position.

According to a state shown in FIG. 7, for example, when the point P1 is set as the measurement target Ps of the edge of the lens 2 (see FIG. 9), the relative position between the lens 2 and the laser displacement meter 20 is adjusted by the data processor 37 as shown in FIG. 11, by controlling the drive of the motors 31, θ32, 34 through the motor controller 35. In this case, moving amount x of the laser displacement meter 20 in the X-direction, moving amount y of the lens 2 in the Y-direction, and rotation amount α of the lens 2 in the θ-direction can be obtained respectively by the following formulas (1), (2), (3). Note that in FIG. 11, angle θ1 formed by the line segment L1 connecting the supporting center O of the lens 2 and the point pk, and the line segment L2 connecting the supporting center O of the lens 2 and the point P1, is the same as the angle θ1 shown in FIG. 7.

$$x = -r1 \times \sin(\theta1 - \alpha) \quad (1)$$

$$y = r1 \times \cos(\theta1 - \alpha) + f \quad (2)$$

wherein f indicates the focal distance with the light projecting part of the laser displacement meter as a reference (for example, 15 mm)

$$r0 \times \cos(\theta0 - \alpha9 = r2 \times \cos(\theta2 - \alpha) \quad (3)$$

wherein $\cos(\theta - \alpha) > 0$

The data processor 37 adjusts the relative position between the lens 2 and the laser displacement meter 20 in a state shown in FIG. 9, by controlling the drive of the X-moving motor 31, the Y-moving motor 32, and the rotation motor 34 based on the moving amount and the rotation amount in each direction obtained as described above. In this state, the laser displacement meter 20 is disposed relative to the lens 2, to observe the reflected light at the measurement target portion, in a reflection state (mirror reflection) in which the incidence angle θi of the laser beams incident on the measurement target portion, and the reflection angle θr of the laser beams reflected from the measurement target portion are equal to each other.

Step S4;

Next, n-th measurement (n is a natural number, an initial value is "1") by the laser displacement meter is executed. "n" is a variable used for judging whether the measurement is ended over the whole circumference of the lens 2. In this case, the measurement of the laser displacement meter 20 is executed using the long diameter portion of the lens 2 as a first measurement target. Further, the normal line passing through the long diameter portion of the lens 2 coincides with the measurement reference axis of the laser displacement meter 20 by performing the aforementioned adjustment prior to executing the measurement. Therefore, when the long diameter portion of the lens 2 is used as the first measurement target, the incidence angle of the laser beams incident on the long diameter portion of the lens 2, and the reflection angle of the laser beams reflected by the measurement target are equal to each other with the normal line of the lens 2 passing through the measurement target as a reference (center), and in this state, the measurement is executed.

Step S5;

Next, whether the edge of the lens 2 is measured over the whole circumference (360°) is judged. Judgment here is performed as follows for example.

Namely, as described above, if the edge of the Lens 2 is divided at 3° pitch in the θ-direction, the number of divisions is 120 in total. In this case, 120 numbers of times of measurements need to be executed for measuring the whole circumference of the edge of the lens 2. Therefore, the number of times of measurement is grasped by variable n using the laser displacement meter 20, and when the variable n reaches 120, it is so judge that the measurement is ended (Yes), and when it does not reach 120, it is so judged that the measurement is not ended (No). Then, when it is so judged that the measurement is not ended, the processing is advanced to the next step, and when it is so judged that the measurement is ended, a series of measurement operation is ended.

Step S6;

Next, 1 is added to the value of n. Therefore, after the first measurement is ended, 1 is added to the value of n, and "n=2" is established. An operation of adding 1 to the value of n, means the change of the position of the measurement target from a previously measured position, to a position supposed to be measured next.

Step S7;

Next, the lens 2 is rotated by a previously set angle pitch portion so as to match the position of the measurement target corresponding to the present value of n. For example, as shown in FIG. 12(A), when the first measurement is performed to the long diameter portion Pa of the lens 2, as shown in FIG. 12(B), the lens 2 is rotated there from by a previously set angle pitch portion θp. Thus, the measurement target portion of the lens 2 is deviated to one adjacent position Pb from a previous position Pa. Thereafter, the processing is returned to the step S3, and the operation similar to the aforementioned operation is repeated.

Note that when the edging data is utilized, the position of the next measurement target portion can be recognized by the data processor 37 using the edging data. Therefore, the processing in step S7 can be omitted to move to the processing of step S3, and the relative position between the lens 2 and the laser displacement meter 20 may be adjusted so as to match the position of the next measurement target portion.

<4. Operation Procedure of the Lens Shape Measurement in a Case of not Utilizing the Processing Data>

Figure 13:
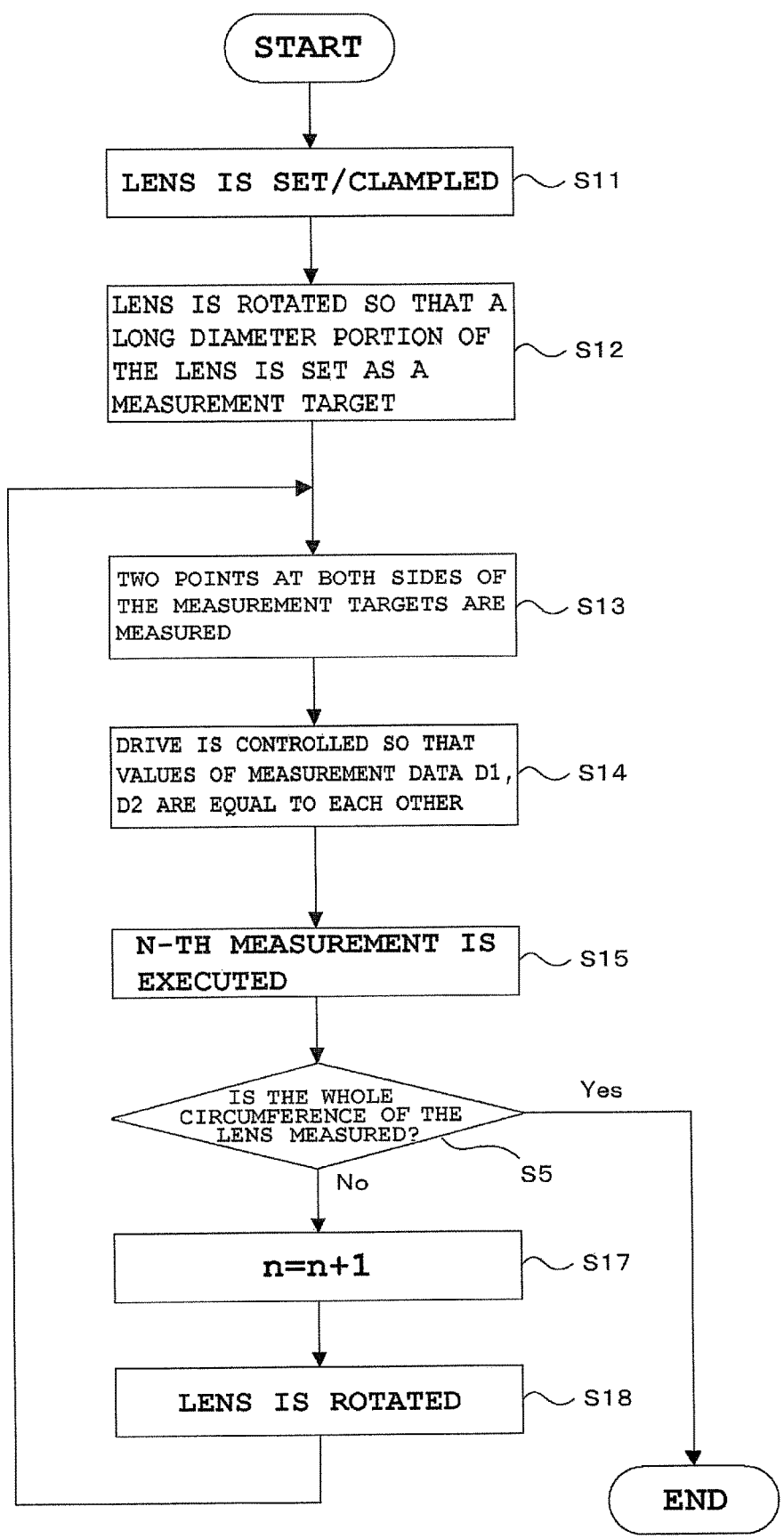
FIG. 13 is a flowchart of an operation procedure of measuring the lens shape in a case that processing data of the lens is not utilized.

FIG. 13 is a flowchart showing an operation procedure of measuring the lens shape in a case of not utilizing the processing data of the lens.

Steps S11 to S12;

First, after the lens 2 is set in the θ-stage 12, the lens 2 is rotated so that the long diameter portion Pa of the lens 2 is the measurement target Ps as shown in FIG. 8. Step S11 is similar to the operation procedure (step S1) in a case of utilizing the processing data. In step S12, the lens 2 is rotated so that the long diameter portion Pa of the lens 2 is the measurement target Ps. More specifically, the rotation of the lens 2 is halted so that the measurement value of the lens displacement meter 20 becomes the maximum value, by performing the operation of gradually approaching the laser displacement meter 20 to the lens 2, and the operation of rotating the lens 2.

Figure 14:
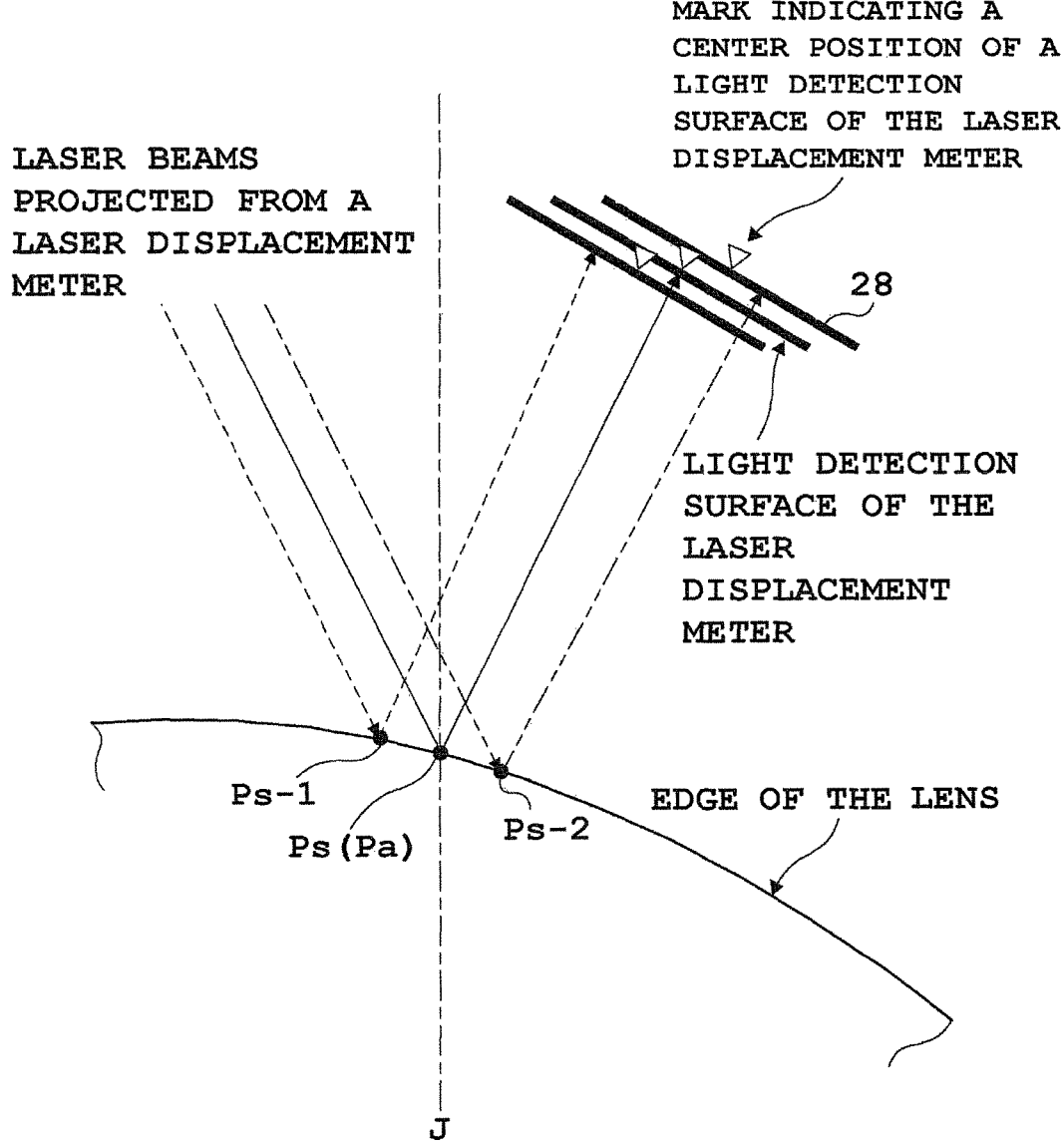
FIG. 14 is a schematic view of an operation example before measurement.

Step S13;

Next, for example when the first measurement target Ps is set as the long diameter portion of the lens 2, prior to executing the n-th measurement (n is a natural number, an initial value is "1"), the measurement using the laser displacement meter 20 is performed to two points (point Ps-1 and point Ps-2) at both sides of the long diameter portion Pa being the measurement target Ps as shown in FIG. 14.

More specifically, the measurement using the laser displacement meter 20 is performed to the point Ps-1 which is positioned slightly deviated to one side in the rotating direction of the lens 2 from the position of the measurement target Ps, and measurement data D1 outputted at this time is captured by the data processor 37.

Figure 12:
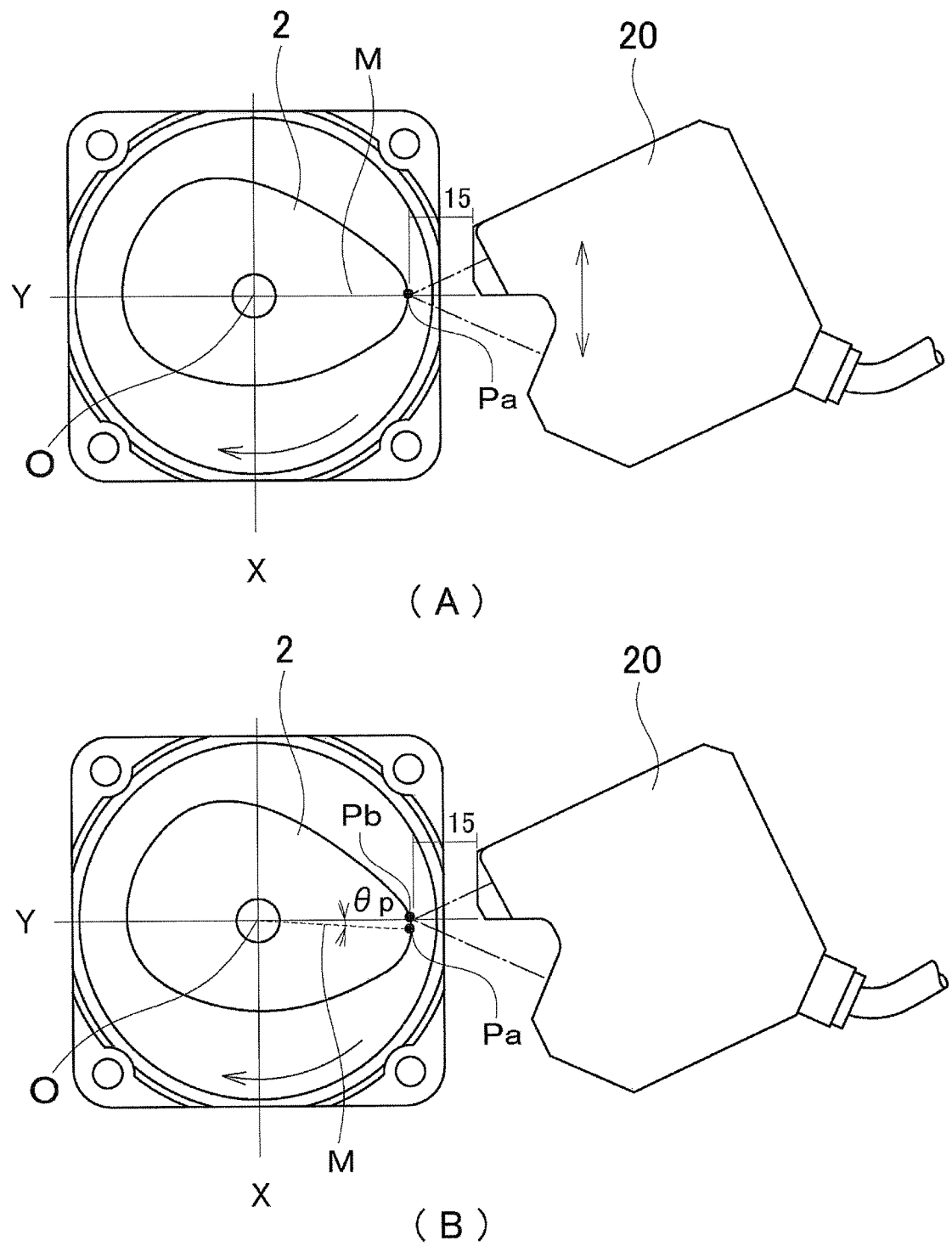
FIG. 12 is a view (3) describing an operation example of the lens shape measurement device.

Next, measurement using the laser displacement meter 20 is performed to the point Ps-2 which is slightly deviated to other side from the position of the measurement target Ps in the rotating direction of the lens 2, and measurement data D2 outputted at this time is captured by the data processor 37.
Step S14;

Next, the lens 2 is rotated so that the values of the measurement data D1, D2 are equal to each other, which is the measurement data captured by the measurement performed to the points Ps-1, Ps-2. This operation is performed to obtain the aforementioned mirror reflection state. At this time, when the lens 2 is rotated, the position of the measurement target Ps is deviated in the X-direction accordingly. Therefore, the laser displacement meter 20 is moved in the X-direction so as to follow a positional fluctuation of the measurement target Ps. Further, when the position of the measurement target Ps is deviated from the focal distance of the laser displacement meter 20, the lens 2 is moved in the Y-direction so that the position of the measurement target Ps falls within the focal distance of the laser displacement meter 20.
Step S15;

Next, n-th measurement is executed. In this case, the measurement target Ps to be measured by the present measurement (n-th measurement) is irradiated with the laser beams from the laser displacement meter 20 under a condition that the values of the measurement data D1, D2 are equal to each other, to thereby execute the measurement of the lens shape. Thus, as shown in FIG. 9, the mirror reflection state is set in which the incidence angle $\theta i$ of the laser beams incident on the measurement target Ps from the laser displacement meter 20, and the reflection angle $\theta r$ of the laser beams reflected by the measurement target Ps are equal to each other with a normal line K of the lens as a reference, which is the normal line passing through the measurement target Ps set on the edge of the lens 2. In this state, the measurement of the lens 2 is executed.
Step S16;

Next, it is judged whether the edge of the lens 2 is measured over the whole circumference (360°) of the lens 2. The judgment here may be performed similarly to the aforementioned "case of utilizing the processing data". Then, when it is so judged that the measurement is not ended, the processing is advanced to the next step, and when it is so judged that the measurement is ended, a series of measurement operation is ended.
Step S17;

Next, 1 is added to the value of "n".
Step S18;

Next, as shown in FIG. 12, the lens 2 is rotated by previously set angle pitch portion $\theta p$. Thus, the measurement target Pb to be measured next is disposed on the Y-axis instead of the measurement target Pa which is already measured before. Thereafter, the processing is returned to the aforementioned step S13, and a similar processing is performed.

<5. Effect of the Embodiment>

The following effect can be obtained by measuring the lens 2 using the lens shape measurement device 1 and the lens shape measurement method according to the embodiment of the present invention.

Even in a case that the edge of the lens 2 being the measurement target is smoothened by polishing, the laser beams projected from the light projecting part 22 of the laser displacement meter 20 is efficiently reflected by the measurement target portion of the lens 2, and the reflected laser beams are efficiently received by the light receiving part 23 of the laser displacement meter 20, compared with a system described in the conventional technique (the system of projecting the laser beams from the laser displacement meter to the rotation center of the lens), when the measurement is performed for each measurement target using the laser displacement meter 20.

In the system of projecting the laser beams from the laser displacement meter to the supporting center of the lens, the laser beams are straightly incident on the edge of the lens or obliquely incident thereon by a curve of the edge of the lens. When the laser beams are straightly incident on the edge of the lens, most of the incident laser beams are not reflected and enter into the lens after smoothening the edge. Further, when the laser beams are obliquely incident on the edge of the lens, remarkable reflection of the laser beams occurs. However, most of the laser beams reflected therefrom are advanced in a different direction from the light receiving part of the laser displacement meter. As a result, there is a possibility that a light receiving amount required for an appropriate measurement by the laser displacement meter cannot be obtained.

Meanwhile, in the aforementioned embodiment, the relative position between the lens 2 and the laser displacement meter 20 is adjusted relative to the normal line of the lens 2 passing through the measurement target, for each measurement target of the lens 2, so that the mirror reflection state is set in which the incidence angle and the reflection angle of the laser beams in the laser displacement meter 20 are equal to each other. Thus, the ratio of the laser beams reflected by the measurement target is increased.

Further, the light quantity of the laser beams received by the laser displacement meter 20 is also increased. As a result, both the reflection of the laser beams by the measurement target of the lens 2, and the reception of the laser beams by the light receiving part 23 of the laser displacement meter 20, are efficiently carried out.

Accordingly, the measurement regarding the shape and the dimension of the lens 2 can be performed with high precision, based on the measurement data obtained by using the laser displacement meter 20.

Further, in the data processor 37, for example, a peripheral length of the lens 2 can be obtained by calculation by totaling a plurality of measurement data by the data processor 37, the measurement data being obtained by sequentially measuring a plurality of measurement targets set on the edge of the lens 2, and applying the totaled data as input values of an operation program installed in the data processor 37 for example. Then, a calculation result thereof (numerical data indicating the peripheral length of the lens) can be displayed on a displayer 39.

In addition, for example, a shape data creation program installed in the data processor 37 is started, using the measurement data obtained by measuring a certain measurement target by the laser displacement meter 20 as the input value, to thereby create shape data (line image data) showing a cross-sectional shape of the edge of the lens 2 in an image, which can be then displayed on the displayer 39.

Further, when the bevel is formed on the edge of the lens 2, numerical data showing the position of a top of the bevel, or numerical data showing a height of the bevel are obtained by calculation, which can be then displayed on the displayer 39. Further, when the groove is formed on the edge of the lens 2, the numerical data showing a width and a depth of the groove is obtained by calculation, which can be then displayed on the displayer 39.

In addition, various shape data and numerical data required for measuring the lens 2 are obtained by the data processor 37, which can be then displayed on the displayer 39.

Figure 15:
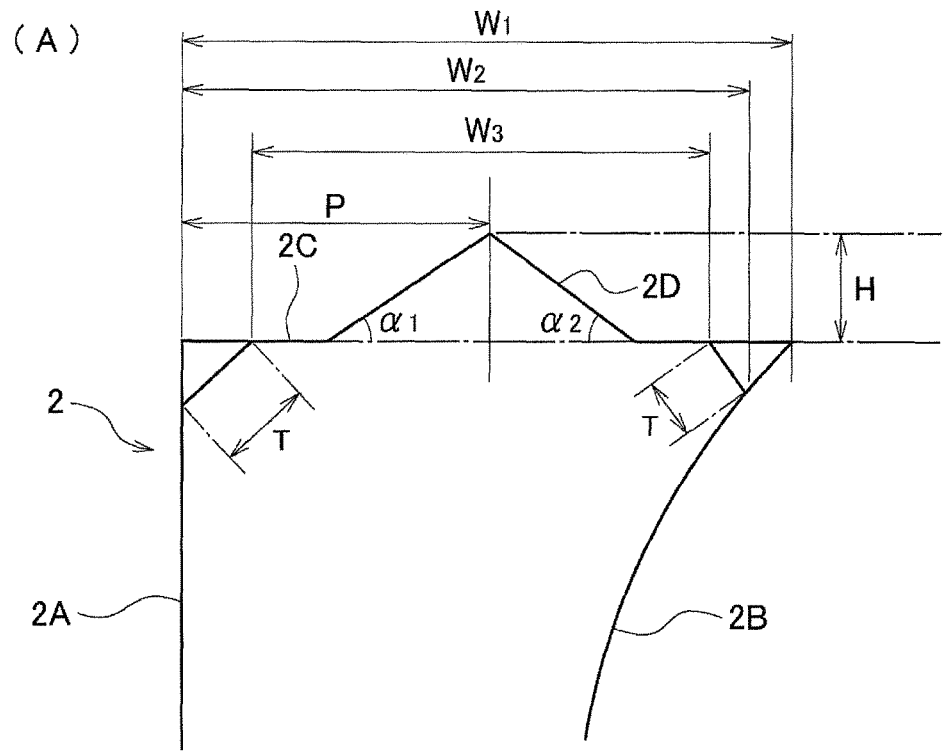
FIG. 15 is a view of an example of measurement items.
Figure 15:
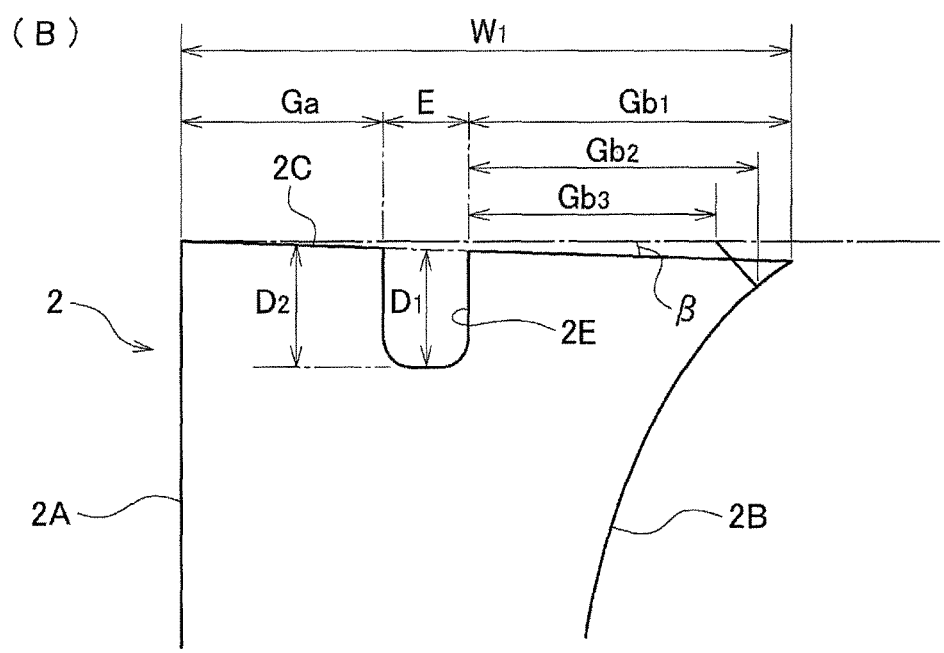

Specific examples of the items that can be measured by the lens shape measurement device 1 and the lens shape measurement method according to the embodiments of the present invention will be described using FIG. 15.

As shown in the figure, measurement items of the lens 2 are described in a relation between a convex surface 2A and a concave surface 2B of the lens 2, including chamfering amount T, width W1 of an edge 2C (W2 or W3 in a case that chamfering is performed), inclination angle β of the edge 2C (for example, the inclination angle relative to an optical axis), and so forth. Further, measurement parts in a case of having a bevel 2D on the edge 2C, include a height H of the bevel 2D, angles α1, α2 of the slope of the bevel 2D, and a position of the top of the bevel 2D (for example, which can be represented by a distance P from the lens convex surface (front surface) or the ratio of the distance P with respect to the width of the edge 2C), and so forth. Further, measurement items in a case of having a groove 2E on the edge 2C, include a depth D of the groove 2E, a width E of the groove 2E, the position of the groove 2E (for example, a distance Ga from the convex surface of the lens (front surface) 2A to an opening end at a front side of the groove 2E, and a distance Gb1 from a peripheral edge of the concave surface of the lens (back surface) 2B to an opening end at a backside of the groove 2E (which can be represented by Gb2 and Gb3 when chamfering is performed) and so forth.

Further, in the aforementioned embodiment, the long diameter portion of the lens 2 is set as the first measurement target when the measurement of the lens 2 is started. Therefore, the relative position between the lens 2 and the laser displacement meter 20 can be adjusted in a short time, compared with a case that other portion excluding a top portion is set as the first measurement target. The reason is as follows. Namely, a top portion is formed on the edge of the lens 2 by the long diameter portion Pa of the lens 2, and the normal line of the lens 2 passing through this top portion runs along a direction of radial rays extending radially from the supporting center O of the lens 2. Meanwhile, the normal line of the lens 2 passing through the portion excluding the top portion does not run along the direction of the radial rays, and has a larger inclination. Therefore, when the lens 2 is rotated in the aforementioned mirror reflection state, not so much adjustment of the relative position of the lens 2 is required even if it needs to be adjusted. Accordingly, a time required from the start of the measurement of the lens 2 until the end of the measurement performed to the first measurement target can be shortened.

Further, when a plurality of measurement targets are set on the edge of the lens 2, a time interval of the angle pitch applied at this time may be uniformly set over the whole circumference of the lens 2, and further preferably the time interval may be set as follows.

Namely, the aforementioned time interval of the angle pitch is set to be relatively large in an area where a curvature radius is relatively large in an outer shape of the lens 2 (area of a loose curve), and the aforementioned time interval of the angle pitch is set to be relatively small in an area where the curvature radius of the lens 2 is relatively small (area of a steep curve).

When the time interval of the angle pitch is set under such a condition, the following effect can be obtained. First, in the area where the curve of the edge of the lens 2 is loose, namely in the area where there is a small variation in the radius distance r from the center of the holding tool to the edge of the lens 2 at the time of rotating the lens, the measurement using the lens displacement meter 20 is strictly performed. Meanwhile, in the area where the curve of the edge of the lens 2 is steep, namely in the area where there is a large variation in the radius distance r from the center of the holding tool to the edge of the lens 2 at the time of rotating the lens, the measurement using the laser displacement meter 20 is roughly performed. Therefore, the measurement with relatively high resolution can be performed at the top portion of the lens 2 and the peripheral part thereof, and the measurement with relatively low resolution can be performed in the other portion. Accordingly, the efficiency of the lens shape measurement can be improved.

Further, as a structure of the lens shape measurement device 1, the structure of mounting on the lens shape measurement device 1, the X-axis moving system 3 that constitutes the first moving unit, and the Y-axis moving system 4 that constitutes the second moving system, is employed in a state that they are structurally separated from each other. Therefore, the direction of the moving axes (X-axis, Y-axis) can be individually adjusted. Further, an inertial force of each structure can be suppressed to be small, owing to a dispersion (reduction) effect of a mass per one structure. This is advantageous for achieving a high speed operation and high precision, compared with a case that the first moving unit and the second moving unit are constituted as one structure.

Further, the structure includes the Z-axis moving system 5 that constitutes the third relative position altering unit. Therefore, when the measurement is performed to a lens with thick edge or a lens with deep lens curve, the relative position between the lens and the measurement unit can be adjusted so that an irradiation position of the laser beams is not deviated from the edge of the lens during rotation of the lens.

DESCRIPTION OF SINGS AND NUMERALS

1 Lens shape measurement device
2 Lens
3 X-axis moving system
4 Y-axis moving system
5 Z-axis moving system
6 θ-axis rotation system
9 X-axis stage unit
10 Y-axis stage unit
11 Z-axis stage unit
12 θ-stage
20 Laser displacement meter
22 Light projecting part
23 Light receiving part
28 Light position detecting element
30 Control computer
31 X-moving motor
32 Y-moving motor
33 Z-moving motor
34 Rotation motor
35 Motor controller
36 Displacement meter controller
37 Data processor
38 Storage device
41 Clamp motor

The invention claimed is:

1. A lens shape measurement device, comprising:
a supporting unit that supports a spectacle lens edged based on edging data;
a laser displacement meter that measures a measurement position of a measurement object utilizing a variation of an observation point of a reflected light which varies depending on the measurement position of the measurement object, when the measurement position of an object surface is irradiated with laser beams, the laser displacement meter being translatable along X and Z axes;
a relative position altering unit that alters a relative position between the spectacle lens supported by the supporting unit and the laser displacement meter; and
a drive controller, wherein the drive controller controls the relative position altering unit based on the edging data at a time of measuring an edging shape of the spectacle lens, the measurement device obtaining, by virtue of the controller controlling the drive of the relative position altering unit based on the edging data, a mirror reflection having a predetermined angle to a normal line passing through a measurement object, for each measurement object of a plurality of measurement objects set on an edge surface of the spectacle lens and the angle is (1) the same incident angle for each of the plurality of measurement objects, (2) the same reflection angle for each of the plurality of measurement objects, or (3) the same incident angle and the same reflection angle for each of the plurality of measurement objects.

2. The lens shape measurement device according to claim 1, wherein
the relative position altering unit includes:
XY-axes moving systems that alter a relative position between the spectacle lens and the laser displacement meter in a direction parallel to a plane including the measurement reference axis of the laser displacement meter;
a Z-axis moving system that alters the relative position between the spectacle lens and the laser displacement meter in a direction vertical to the plane; and
a θ-axis rotation system that rotates the spectacle lens around a rotation axis vertical to the plane, and
the drive controller controls drive of the XY-axes moving systems, the Z-axis moving system, and the θ-axis rotation system so that a normal line passing through the measurement object coincides with the measurement reference axis, and the measurement object is positioned at the focal position.

3. The lens shape measurement device according to claim 2,
wherein the XY-axes moving systems including:
an X-axis moving system and a Y-axis moving system composed of two different moving axes, in a mutually structurally separated state,
wherein the laser displacement meter is attached to one of these X-axis moving system and Y-axis moving system, and the θ-axis rotation system supporting the spectacle lens is attached to the other moving system.

4. The lens shape measurement device according to claim 3, wherein the laser displacement meter is attached to one of the moving systems through the Z-axis moving system.

5. The lens shape measurement device according to claim 1, wherein the lens is rotated by driving of the relative position altering unit from a state at which each part of the lens shape measurement device is set at a home position, and the lens is moved so as to gradually approach the laser displacement meter by the drive of a motor of the relative position altering unit that moves the lens along a depth axis.

6. A lens shape measurement device, comprising:
a supporting unit that supports a spectacle lens edged based on edging data;
a laser displacement meter that measures a measurement position of an object utilizing a variation of an observation point of a reflected light which varies depending on the measurement position of the object, when the measurement position of an object surface is irradiated with laser beams, the laser displacement meter being translatable along X and Z axes;
a relative position altering unit that alters a relative position between the spectacle lens supported by the supporting unit and the laser displacement meter; and
a drive controller, wherein the drive controller controls the relative position altering unit at a time of measuring an edging shape of the spectacle lens, the measurement device obtaining, by virtue of the controller controlling the drive of the relative position altering unit, a mirror reflection having a predetermined angle to a normal line passing through each measurement object of a plurality of measurement objects set on an edge surface of the spectacle lens and the angle is (1) the same incident angle for each of the plurality of measurement objects, (2) the same reflection angle for each of the plurality of measurement objects, or (3) the same incident angle and the same reflection angle for each of the plurality of measurement objects, by controlling the drive of the relative position altering unit so that an output from the light receiving part at a time of irradiating at least one laser beam from the light projecting part to a first place deviated to one side in a circumferential direction of the lens from the measurement object, and an output from the light receiving part at a time of irradiating at least one laser beam from the light projecting part to a second place deviated to another side in the circumferential direction of the spectacle lens from the measurement object, are equal to each other.

7. The lens shape measurement device according to claim 6, wherein
the relative position altering unit includes:
XY-axes moving systems that alter a relative position between the spectacle lens and the laser displacement meter in a direction parallel to a plane including the measurement reference axis of the laser displacement meter;
a Z-axis moving system that alters the relative position between the spectacle lens and the laser displacement meter in a direction vertical to the plane; and
a θ-axis rotation system that rotates the spectacle lens around a rotation axis vertical to the plane, and
the drive controller controls drive of the XY-axes moving systems, the Z-axis moving system, and the θ-axis rotation system so that a normal line passing through the measurement object coincides with the measurement reference axis, and the measurement object is positioned at the focal position.

8. The lens shape measurement device according to claim 7,
wherein the XY-axes moving systems including:
an X-axis moving system and a Y-axis moving system composed of two different moving axes, in a mutually structurally separated state, wherein the laser displacement meter is attached to one of these X-axis moving system and Y-axis moving system, and the θ-axis rotation system supporting the spectacle lens is attached to the other moving system.

9. The lens shape measurement device according to claim 8, wherein the laser displacement meter is attached to one of the moving systems through the Z-axis moving system.

10. A lens shape measurement device, comprising:
a supporting unit that supports a spectacle lens edged based on edging data;
a laser displacement meter having
a light projecting part configured to obliquely irradiating a measurement reference axis with a laser beam, and
a light receiving part configured to receive the laser beam which is irradiated to each measurement object of a plurality of measurement objects set on an edge surface of the spectacle lens from the light projecting part and reflected by the measurement object,
the laser displacement meter being translatable along X and Z axes,
wherein an intersection point of the measurement reference axis and the laser beam irradiated from the light projecting part is set as a focal position;
a relative position altering unit that alters a relative position between the spectacle lens supported by the supporting unit and the laser displacement meter; and
a drive controller, wherein the drive controller controls, at a time of measuring an edging shape of the spectacle lens,
a drive of the relative position altering unit based on the edging data so that a normal line passing through the measurement object coincides with the measurement reference axis and the measurement object is positioned at the focal position, for each measurement object of the plurality of measurement objects, and
the measurement device obtaining, by virtue of the controller controlling the drive of the relative position altering unit based on the edging data, a mirror reflection having a predetermined angle to the normal line for each measurement object of the plurality of measurement objects and the angle is (1) the same incident angle for each of the plurality of measurement objects, (2) the same reflection angle for each of the plurality of measurement objects, or (3) the same incident angle and the same reflection angle for each of the plurality of measurement objects.

11. The lens shape measurement device according to claim 10, wherein
the relative position altering unit includes:
XY-axes moving systems that alter a relative position between the spectacle lens and the laser displacement meter in a direction parallel to a plane including the measurement reference axis of the laser displacement meter;
a Z-axis moving system that alters the relative position between the spectacle lens and the laser displacement meter in a direction vertical to the plane; and
a θ-axis rotation system that rotates the spectacle lens around a rotation axis vertical to the plane, and
the drive controller controls drive of the XY-axes moving systems, the Z-axis moving system, and the θ-axis rotation system so that a normal line passing through the measurement object coincides with the measurement reference axis, and the measurement object is positioned at the focal position.

12. The lens shape measurement device according to claim 11,
wherein the XY-axes moving systems including:
an X-axis moving system and a Y-axis moving system composed of two different moving axes, in a mutually structurally separated state,
wherein the laser displacement meter is attached to one of these X-axis moving system and Y-axis moving system, and the θ-axis rotation system supporting the spectacle lens is attached to the other moving system.

13. The lens shape measurement device according to claim 12, wherein the laser displacement meter is attached to one of the moving systems through the Z-axis moving system.

14. The lens shape measurement device according to claim 10, wherein the lens is rotated by driving of the relative position altering unit from a state at which each part of the lens shape measurement device is set at a home position, and the lens is moved so as to gradually approach the laser displacement meter by the drive of a motor of the relative position altering unit that moves the lens along a depth axis.

15. A lens shape measurement device, comprising:
a supporting unit that supports a spectacle lens edged based on edging data;
a laser displacement meter having
a light projecting part configured to obliquely irradiating a measurement reference axis with laser beams, and
a light receiving part configured to receive the laser beams which are irradiated to each measurement object of a plurality of measurement objects set on an edge surface of the spectacle lens supported by the supporting unit from the light projecting part and reflected by the measurement object,
the laser displacement meter being translatable along X and Z axes,
wherein an intersection point of the measurement reference axis and the laser beams irradiated from the light projecting part is set as a focal position;
a relative position altering unit that alters a relative position between the spectacle lens supported by the supporting unit and the laser displacement meter; and
a drive controller, wherein the drive controller controls, at the time of measuring an edging shape of the spectacle lens,
a drive of the relative position altering unit in such a manner that a normal line passing through the measurement object coincides with the measurement reference axis and the measurement object is positioned at the focal position, by controlling the drive of the relative position altering unit so that light output from the light receiving part at the time of irradiating the laser beams from the light projecting part to a first place deviated to one side in a circumferential direction of the lens from the measurement object, and light output from the light receiving part at the time of irradiating the laser beams from the light projecting part to a second place deviated to other side in the circumferential direction of the spectacle lens from the measurement object, are equal to each other, for each measurement object of the plurality of measurement objects, and
the measurement device obtaining, by virtue of the controller controlling the drive of the relative position altering unit, a mirror reflection having a predetermined angle to the normal line for each measurement object of the plurality of measurements and the angle is (1) the same incident angle for each of the plurality of measurement objects, (2) the same reflection angle for each of the plurality of measurement objects, or (3) the same incident angle and the same reflection angle for each of the plurality of measurement objects.

16. The lens shape measurement device according to claim 15, wherein
the relative position altering unit includes:
XY-axes moving systems that alter a relative position between the spectacle lens and the laser displacement meter in a direction parallel to a plane including the measurement reference axis of the laser displacement meter;
a Z-axis moving system that alters the relative position between the spectacle lens and the laser displacement meter in a direction vertical to the plane; and
a θ-axis rotation system that rotates the spectacle lens around a rotation axis vertical to the plane, and
the drive controller controls drive of the XY-axes moving systems, the Z-axis moving system, and the θ-axis rotation system so that a normal line passing through the measurement object coincides with the measurement reference axis, and the measurement object is positioned at the focal position.

17. The lens shape measurement device according to claim 16,
wherein the XY-axes moving systems including:
an X-axis moving system and a Y-axis moving system composed of two different moving axes, in a mutually structurally separated state,
wherein the laser displacement meter is attached to one of these X-axis moving system and Y-axis moving system, and the θ-axis rotation system supporting the spectacle lens is attached to the other moving system.

18. The lens shape measurement device according to claim 17, wherein the laser displacement meter is attached to one of the moving systems through the Z-axis moving system.

* * * * *